(12) United States Patent
Akiyama

(10) Patent No.: US 11,126,076 B2
(45) Date of Patent: Sep. 21, 2021

(54) ILLUMINATION OPTICAL APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/005,467

(22) Filed: Aug. 28, 2020

(65) Prior Publication Data

US 2021/0063858 A1    Mar. 4, 2021

(30) Foreign Application Priority Data

Aug. 29, 2019 (JP) .............................. JP2019-157073

(51) Int. Cl.
| | | |
|---|---|---|
| *G03B 21/20* | (2006.01) | |
| *H04N 9/31* | (2006.01) | |
| *G02B 3/00* | (2006.01) | |
| *G02B 27/28* | (2006.01) | |
| *G02B 27/10* | (2006.01) | |

(52) U.S. Cl.
CPC ......... *G03B 21/208* (2013.01); *G02B 3/0068* (2013.01); *G02B 27/1006* (2013.01); *G02B 27/283* (2013.01); *G03B 21/204* (2013.01); *G03B 21/2073* (2013.01)

(58) Field of Classification Search
CPC ............... G03B 21/208; G03B 21/204; G03B 21/2013; H04N 9/3152; H04N 9/3164
See application file for complete search history.

(56) References Cited

U.S. PATENT DOCUMENTS

| | | | |
|---|---|---|---|
| 5,161,042 A | 11/1992 | Hamada | |
| 2018/0252993 A1* | 9/2018 | Akiyama | ........... G03B 21/2013 |

FOREIGN PATENT DOCUMENTS

JP    H04-060538 A    2/1992

* cited by examiner

*Primary Examiner* — Ryan D Howard
(74) *Attorney, Agent, or Firm* — Oliff PLC

(57) ABSTRACT

An illumination optical apparatus includes a light source apparatus that outputs light in a first direction along an illumination optical axis and a homogenizer. The light source apparatus includes first to fourth light exiting sections via which first to fourth color light fluxes exit. The homogenizer includes a first array set, a second array set, a third array set, a fourth array set, and a superimposing lens. The array sets each include a pair of lens arrays, and at least one of the array sets inclines with respect to an imaginary plane perpendicular to the illumination optical axis in such a way that a first area is shifted in the first direction from a second area the distance from which to the illumination optical axis is longer than the distance from the first area to the illumination optical axis.

12 Claims, 22 Drawing Sheets

ILLUMINATION OPTICAL APPARATUS AND PROJECTOR

The present application is based on, and claims priority from JP Application Serial Number 2019-157073, filed Aug. 29, 2019, the disclosure of which is hereby incorporated by reference herein in its entirety.

BACKGROUND

1. Technical Field

The present disclosure relates to an illumination optical apparatus and a projector.

2. Related Art

There has been a known projector that modulates light outputted from a light source to form an image according to image information and projects the formed image. As a projector of this type, there is a known single-panel projector that separates light outputted from a white-light light source into a plurality of color light fluxes and causes the separated color light fluxes to be incident on corresponding sub-pixels for color display (see JP-A-4-60538, for example).

In the projector described in JP-A-4-60538, a red light reflecting dichroic mirror, a green light reflecting dichroic mirror, and a blue light reflecting dichroic mirror are disposed along the optical axis of the light outputted from the light source and incident on the dichroic mirrors in such a way that the dichroic mirrors are non-parallel to one another. The dichroic mirrors therefore separate the light outputted from the light source into red light, green light, and blue light that travel in the same plane but along directions slightly different from one another. The separated red light, green light, and blue light are collected by microlenses provided on the light incident side of a light modulation device, and the collected red light, green light, and blue light are incident on red sub-pixels, green sub-pixels, and blue sub-pixels of the light modulator, respectively.

In the projector described in JP-A-4-60538, the red light, the green light, and the blue light reflected off the respective dichroic mirrors are incident on the light modulation device via microlenses. When a liquid crystal display device having a modulation area where a plurality of pixels that each modulate the light incident thereon are arranged is used as such a light modulator, illuminance unevenness in the modulation areas illuminated with the color light fluxes causes a problem of color unevenness in a projected image.

An illumination optical apparatus that is unlikely to cause illumination unevenness in an illumination receiving area has therefore been desired.

SUMMARY

An illumination optical apparatus according to a first aspect of the present disclosure includes a light source apparatus that outputs light in a first direction along an illumination optical axis and a homogenizer that irradiates an illumination receiving area with the light outputted from the light source apparatus in a substantially uniform manner. The light source apparatus includes a first light exiting section via which a first color light flux exits, a second light exiting section via which a second color light flux exits, a third light exiting section via which a third color light flux exits, and a fourth light exiting section via which a fourth color light flux exits. The first, second, third, and fourth light exiting sections are provided in positions different from one another. The homogenizer includes, when two directions that intersect the first direction and are perpendicular to each other are second and third directions, a first array set which includes a pair of lens arrays each disposed in a position shifted in the second direction from the illumination optical axis and in the third direction from the illumination optical axis and on which the first color light flux is incident, a second array set which includes a pair of lens arrays each disposed in a position shifted in the second direction from the illumination optical axis and in a direction opposite the third direction from the illumination optical axis and on which the second color light flux is incident, a third array set which includes a pair of lens arrays each disposed in a position shifted in a direction opposite the second direction from the illumination optical axis and in the third direction from the illumination optical axis and on which the third color light flux is incident, a fourth array set which includes a pair of lens arrays each disposed in a position shifted in the direction opposite the second direction from the illumination optical axis and in the direction opposite the third direction from the illumination optical axis and on which the fourth color light flux is incident, and a superimposing lens that superimposes the first color light flux that passes through the first array set, the second color light flux that passes through the second array set, the third color light flux that passes through the third array set, and the fourth color light flux that passes through the fourth array set on the illumination receiving area. The first, second, third, and fourth array sets each have a first area and a second area a distance from which to the illumination optical axis is longer than a distance from the first area to the illumination optical axis. At least one of the first, second, third, and fourth array sets inclines with respect to an imaginary plane perpendicular to the illumination optical axis in such a way that the first area is shifted in the first direction from the second area.

In the first aspect described above, the first light exiting section may be located in a position shifted in the second direction from the illumination optical axis and in the third direction from the illumination optical axis. The second light exiting section may be located in a position shifted in the second direction from the illumination optical axis and in the direction opposite the third direction from the illumination optical axis. The third light exiting section may be located in a position shifted in the direction opposite the second direction from the illumination optical axis and in the third direction from the illumination optical axis. The fourth light exiting section may be located in a position shifted in the direction opposite the second direction from the illumination optical axis and in the direction opposite the third direction from the illumination optical axis.

In the first aspect described above, the first, second, third, and fourth color light fluxes may be color light fluxes that belong to wavelength bands different from one another, and the first, second, third, and fourth array sets may each incline with respect to the imaginary plane in such a way that the first area is shifted in the first direction from the second area.

In the first aspect described above, the first color light flux may be green light, the second color light flux may be red light, the third color light flux may be blue light, and the fourth color light flux may be yellow light.

In the first aspect described above, the light source apparatus may include a light source section that outputs light source light, a first polarization separator that transmits a first polarized component of the light source light out of the light source light incident in the second direction on the first polarization separator in such a way that the transmitted first polarized component travels in the second direction and reflects a second polarized component of the light source light out of the incident light source light in such a way that the reflected second polarized component travels in a direction opposite the first direction, a second polarization separator that is located in a position shifted in the second direction from the first polarization separator and reflects the first polarized component of the light source light incident in the second direction on the second polarization separator in such a way that the reflected first polarized component travels in the direction opposite the first direction, a first reflector that is located in a position shifted in the direction opposite the first direction from the first polarization separator and reflects the light source light incident on the first reflector in such a way that the reflected light source light travels in the first direction, a first phase retarder that is located between the first polarization separator and the first reflector in the first direction and converts a polarization state of the light source light, a wavelength converter that is located in a position shifted in the direction opposite the first direction from the second polarization separator, converts a wavelength of the first polarized component of the light source light incident in the direction opposite the first direction on the wavelength converter, and outputs nonpolarized converted light that is the converted first polarized component in the first direction, a second phase retarder that is a half wave plate which is located in a position shifted in the first direction from the second polarization separator and on which the converted light that passes through the second polarization separator is incident, a first color separator that is located in a position shifted in the first direction from the second phase retarder and separates the converted light incident from the second phase retarder on the first color separator into the first color light flux and the second color light flux, a second color separator that is located in a position shifted in the first direction from the first polarization separator and separates the light incident in the first direction from the first polarization separator on the second color separator into the third color light flux and the fourth color light flux, and a third phase retarder that is a half wave plate that is located in an optical path of the third color light flux separated by the second color separator, converts a polarization direction of the third color light flux, and outputs the converted third color light flux. The second polarization separator may transmit in the first direction the first polarized component of the converted light out of the converted light incident in the first direction on the second polarization separator to cause the first polarized component to enter the second phase retarder and reflect the second polarized component of the converted light in the direction opposite the second direction. The first polarization separator may transmit in the first direction the first polarized component of the light source light incident in the first direction on the first polarization separator to cause the first polarized component to enter the second color separator and reflect in the first direction the second polarized component of the converted light incident in the direction opposite the second direction on the first polarization separator to cause the second polarized component to enter the second color separator.

In the first aspect described above, the light source apparatus may include a partial reflector that is provided in an optical path of the fourth color light flux that exits out of the second color separator, transmits a portion of the fourth color light flux incident on the partial reflector, and reflects another portion of the fourth color light flux.

In the first aspect described above, the first and fourth color light fluxes may be color light fluxes that belong to the same wavelength band, the second and third color light fluxes may be color light fluxes that belong to wavelength bands different from each other, and the second and third array sets may each incline with respect to the imaginary plane in such a way that the first area is shifted in the first direction from the second area.

In the first aspect described above, the first and fourth color light fluxes may each be green light, the second color light flux may be red light, and the third color light flux may be blue light.

In the first aspect described above, the light source apparatus may include a light source section that outputs light source light, a first polarization separator that transmits a first polarized component of the light source light out of the light source light incident in the second direction on the first polarization separator in such a way that the transmitted first polarized component travels in the second direction and reflects a second polarized component of the light source light out of the incident light source light in such a way that the reflected second polarized component travels in a direction opposite the first direction, a second polarization separator that is located in a position shifted in the second direction from the first polarization separator and reflects the first polarized component of the light source light incident in the second direction on the second polarization separator in such a way that the reflected first polarized component travels in the direction opposite the first direction, a first reflector that is located in a position shifted in the direction opposite the first direction from the first polarization separator and reflects the light source light incident on the first reflector in such a way that the reflected light source light travels in the first direction, a first phase retarder that is located between the first polarization separator and the first reflector in the first direction and converts a polarization state of the light source light, a wavelength converter that is located in a position shifted in the direction opposite the first direction from the second polarization separator, converts a wavelength of the first polarized component of the light source light incident in the direction opposite the first direction on the wavelength converter, and outputs nonpolarized converted light that is the converted first polarized component in the first direction, a second phase retarder that is a half wave plate which is located in a position shifted in the first direction from the second polarization separator and on which the converted light that passes through the second polarization separator is incident, a first color separator that is located in a position shifted in the first direction from the second phase retarder and separates the converted light incident from the second phase retarder on the first color separator into the first color light flux and the second color light flux, a second color separator that is located in a position shifted in the first direction from the first polarization separator and separates the light incident in the first direction from the first polarization separator on the second color separator into the first polarized component of the light source light and the second polarized component of the converted light, a third phase retarder that is a half wave plate that is located in an optical path of the first polarized component of the light source light separated by the second color separator, converts a polarization direction of the second polarized component of the light source light, and outputs the converted second polarized component as the third color light flux, and a third color separator that is located in an optical path of a second polarized component of the converted light separated by the second color separator, outputs as the fourth color light flux a color light flux that belongs to the same wavelength band to which the first light source light belongs out of the second polarized component of the converted light incident on the third color separator, and reflects other color light fluxes. The second polarization separator may transmit in the first direction the first polarized component of the converted light out of the converted light incident in the first direction on the second polarization separator to cause the first polarized component to enter the second phase retarder and reflect the second polarized component of the converted light in the direction opposite the second direction. The first polarization separator may transmit in the first direction the first polarized component of the light source light incident in the first direction on the first polarization separator to cause the first polarized component to enter the second color separator and reflect in the first direction the second polarized component of the converted light incident in the direction opposite the second direction on the first polarization separator to cause the second polarized component to enter the second color separator.

In the first aspect described above, at least one of the array sets may be caused to pivot around at least one of a pivotal axis parallel to the second direction and a pivotal axis parallel to the third direction to incline with respect to the imaginary plane.

In the first aspect described above, the illumination receiving area may be an oblong area having long sides parallel to the second direction when viewed from a light incident side and short sides parallel to the third direction when viewed from the light incident side, and at least one of the array sets may be caused to pivot at least around a pivotal axis along the third direction to incline with respect to the imaginary plane.

A projector according to a second aspect of the present disclosure may include any of the illumination optical apparatuses described above, a light modulator having a modulation area that modulates light incident from the illumination optical apparatus, and a projection optical apparatus that projects the light modulated by the light modulator, and the modulation area is located at the illumination receiving area.

DESCRIPTION OF EXEMPLARY EMBODIMENTS

First Embodiment

A first embodiment of the present disclosure will be described below with reference to the drawings.
Schematic Configuration of Projector FIG. 1 is a diagrammatic view showing the internal configuration of a projector 1A according to the present embodiment.

The projector 1A according to the present embodiment modulates light outputted from a light source apparatus 2A to form an image according to image information, enlarges the formed image, and projects the enlarged image on a projection receiving surface, such as a screen. In detail, the projector 1A is what is called a single-panel projector in which one light modulator 6 including one liquid crystal panel 61 modulates the light outputted from the light source apparatus 2A to form an image and the formed image is projected.

Figure 1:
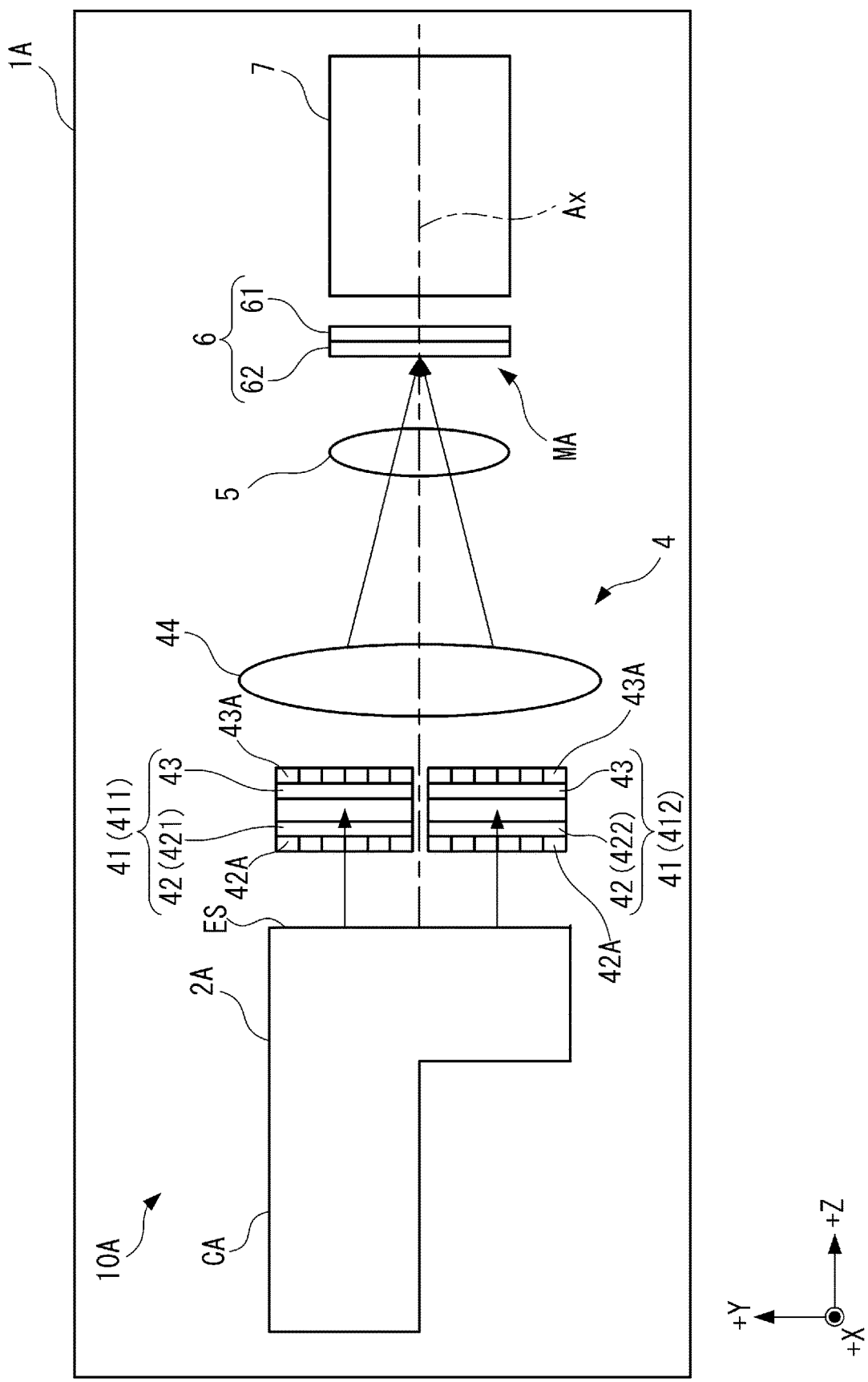
FIG. 1 is a diagrammatic view showing the internal configuration of a projector in a first embodiment.

The projector 1A includes an illumination optical apparatus 10A including the light source apparatus 2A and a homogenizer 4, a field lens 5, the light modulator 6, and a projection optical apparatus 7, which are disposed in predetermined positions along an illumination optical axis Ax set in the projector 1A, as shown in FIG. 1.

Out of the components described above, the illumination optical apparatus 10A illuminates a modulation area MA, which is an image formation area provided in a illumination receiving area of the light modulator 6. That is, the illumination optical apparatus 10A illuminates the modulation area MA, which is the illumination receiving area.

In the following description, the direction in which the light outputted from the light source apparatus 2A travels along the illumination optical axis Ax is called a direction +Z, and the two directions perpendicular to the direction +Z and perpendicular to each other are called directions +X and +Y. Out of the three directions, the direction +Y is called an upward direction in the projector 1A. The direction +X is called a rightward direction when a target object on which the light is incident along the direction +Z is viewed with the direction +Y oriented upward. Although not shown, the direction opposite the direction +X called a direction −X, the direction opposite the direction +Y is called a direction −Y, and the direction opposite the direction +Z is called a direction −Z.

The direction +Z corresponds to a first direction along the illumination optical axis Ax. The direction +X corresponds to a second direction. The direction +Y corresponds to a third direction. Although not shown, an axis parallel to the direction +X is an axis X, and an axis parallel to the direction +Y is an axis Y for convenience of description.

Configuration of Light Source Apparatus

The light source apparatus 2A outputs a light flux that is one type of linearly polarized light. In detail, the light source apparatus 2A outputs a plurality of color light fluxes that are linearly polarized light fluxes polarized in the same polarization direction and are spatially separate from one another, and the plurality of color light fluxes exit in the direction +Z from light exiting positions different from one another.

The light source apparatus 2A includes an enclosure CA, which is a light source apparatus enclosure that accommodates optical parts that form the light source apparatus 2A. The color light fluxes outputted from the light source apparatus 2A exit via a light exiting surface ES, which is a +Z-direction-side surface of the enclosure CA and faces the homogenizer 4.

Figure 2:
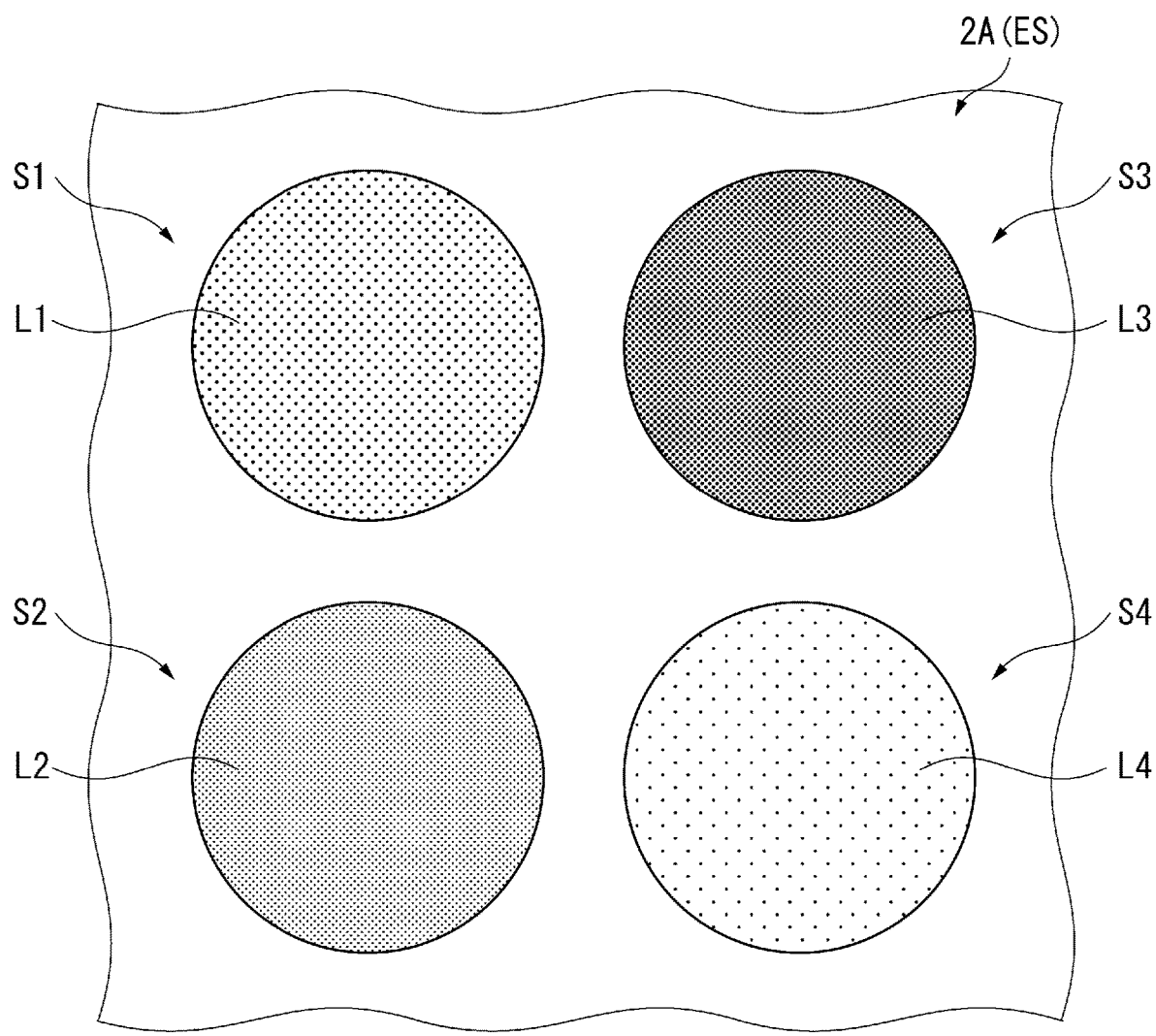
FIG. 2 shows light exiting sections via which a plurality of color light fluxes exit from a light source apparatus in the first embodiment.

FIG. 2 shows light exiting sections of the light source apparatus 2A that are sections via which a plurality of color light fluxes L1 to L4 exit. In other words, FIG. 2 shows the light exiting surface ES of the light source apparatus 2A viewed along the direction +Z.

Specifically, the light source apparatus 2A includes a first light exiting section S1, via which a first color light flux L1 exits, a second light exiting section S2, via which a second color light flux L2 exits, a third light exiting section S3, via which a third color light flux L3 exits, and a fourth light exiting section S4, via which a fourth color light flux L4 exits, as shown in FIG. 2.

The first light exiting section S1 is located in a position located on the light exiting surface ES and shifted in the direction +X and the direction +Y. The second light exiting section S2 is located in a position located on the light exiting surface ES and shifted in the direction +X and the direction −Y. The third light exiting section S3 is located in a position located on the light exiting surface ES and shifted in the direction −X and the direction +Y. The fourth light exiting section S4 is located in a position located on the light exiting surface ES and shifted in the direction −X and the direction −Y. That is, the second light exiting section S2 is located in a position shifted from the first light exiting section S1 in the direction −Y. The third light exiting section S3 is located in a position shifted from the first light exiting section S1 in the direction −X. The fourth light exiting section S4 is located in a position shifted from the third light exiting section S3 in the direction −Y.

In the present embodiment, the first color light flux L1 is green light, the second color light flux L2 is red light, the third color light flux L3 is blue light, and the fourth color light flux L4 is yellow light.

Figure 3:
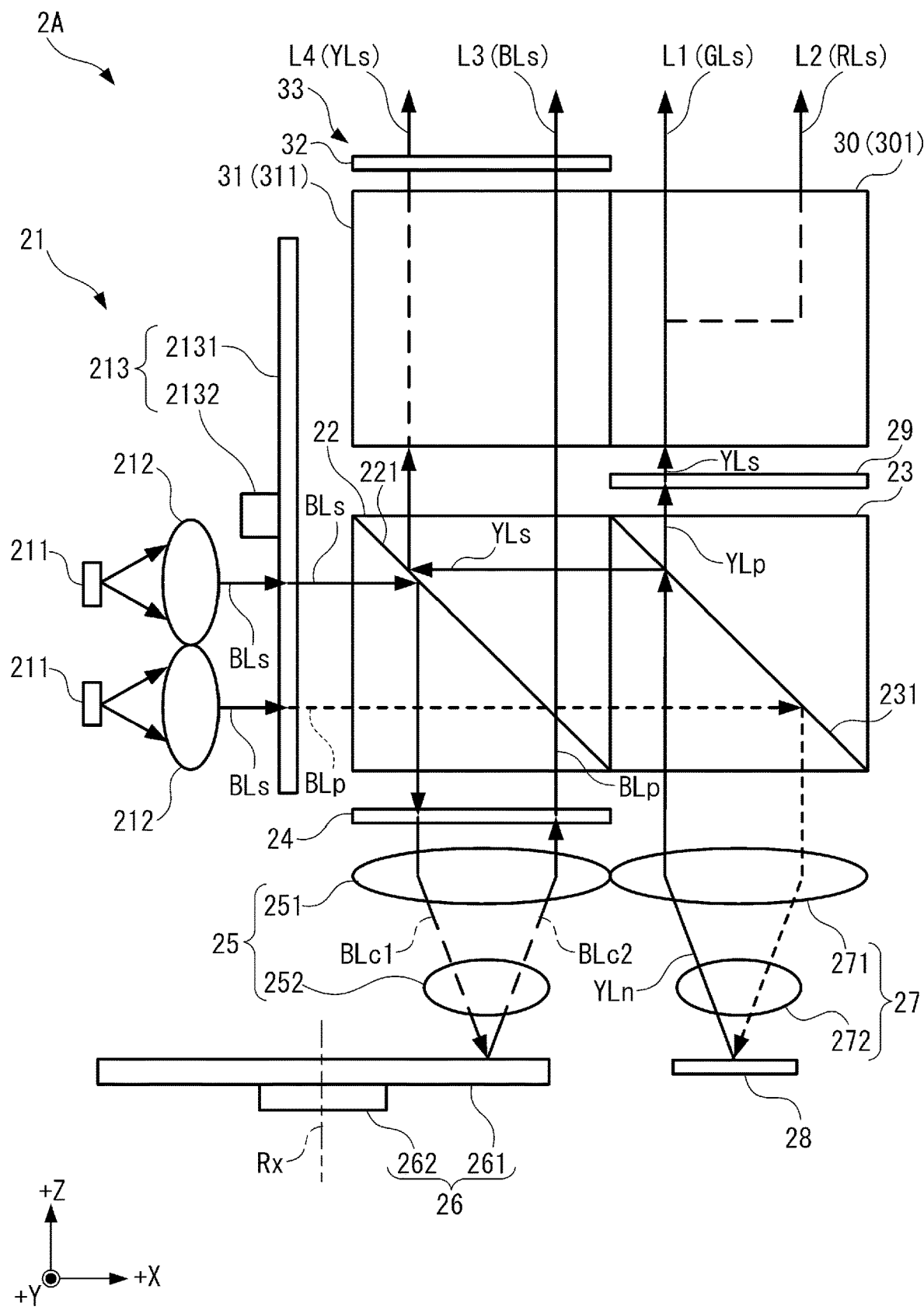
FIG. 3 is a diagrammatic view showing the configuration of the light source apparatus in the first embodiment.

FIG. 3 is a diagrammatic view showing the configuration of the light source apparatus 2A. In other words, FIG. 3 is a plan view of the light source apparatus 2A viewed along the direction +Y.

The light source apparatus 2A includes a light source section 21, a first polarization separator 22, a second polarization separator 23, a first phase retarder 24, a first light collector 25, a first reflector 26, a second light collector 27, a wavelength converter 28, a second phase retarder 29, a first color separator 30, a second color separator 31, a third phase retarder 32, and a second reflector 33, as shown in FIG. 3.

Configuration of Light Source Section

The light source section 21 outputs light source light in the direction +X. The light source section 21 includes light sources 211, collimator lenses 212, and a rotary phase retardation apparatus 213.

The light sources 211 are each a solid-state light source that outputs blue light. In detail, the light sources 211 are each a laser diode (LD) that is a semiconductor laser that outputs s-polarized blue light BLs to a polarization separation layer 221 of the first polarization separator 22 and a polarization separation layer 231 of the second polarization separator 23. The blue light BLs outputted by each of the light sources 211 is laser light having a peak wavelength ranging, for example, from 450 to 460 nm.

The collimator lenses 212 each parallelize the light outputted from the corresponding light source 211.

The rotary phase retardation apparatus 213 includes a phase retarder 2131 and a rotator 2132, which rotates the phase retarder 2131 around an axis of rotation parallel to the direction +X.

The phase retarder 2131 corresponds to the fourth phase retarder and is a half wave plate or a quarter wave plate. Part of the blue light BLs incident on the phase retarder 2131 via each of the collimator lenses 212 is converted, when passing through the phase retarder 2131, into p-polarized blue light BLp. The blue light having passed through the phase retarder 2131 is therefore the mixture of the original blue light BLs and the blue light BLp mixed at a predetermined ratio.

The rotator 2132 adjusts the angle of rotation of the phase retarder 2131 to adjust the ratio between the blue light BLs and the blue light BLp contained in the blue light that passes through the phase retarder 2131. The rotator 2132 may be omitted.

The light source light outputted by the light source section 21 thus contains the blue light BLp, which is a first polarized component and is p-polarized light with respect to the polarization separation layer 221 of the first polarization separator 22 and the polarization separation layer 231 of the second polarization separator 23, and the blue light BLs, which is a second polarized component and is s-polarized light with respect to the polarization separation layer 221 of the first polarization separator 22 and the polarization separation layer 231 of the second polarization separator 23.

The light sources 211 are each configured to output the blue light BLs and may instead each be configured to output the blue light BLp. The light sources 211 may still instead each be configured to output the blue light BLs and the blue light BLp. In this case, the rotary phase retardation apparatus 213 can be omitted. Further, the light sources 211 do not necessarily each include a semiconductor laser and may include another type of solid-state light source, such as an LED (light emitting diode).

The s-polarized light in the present embodiment is s-polarized light with respect to the polarization separation layer 221 of the first polarization separator 22 and the polarization separation layer 231 of the second polarization separator 23. Similarly, the p-polarized light in the present embodiment is p-polarized light with respect to the polarization separation layer 221 of the first polarization separator 22 and the polarization separation layer 231 of the second polarization separator 23.

In the present embodiment, the p-polarized light corresponds to the first polarized component, and the s-polarized light corresponds to the second polarized component.

Configuration of First Polarization Separator

The blue light BLs and the blue light BLp, which form the light source light from the light source section 21, are incident on the first polarization separator 22 along the direction +X.

The first polarization separator 22 is a prism-shaped polarization separator formed by combining two prism pieces each being a substantially right-angled isosceles triangular column with each other into a substantially box-like shape, and the polarization separation layer 221 is provided at the interface between the two prism pieces.

The polarization separation layer 221 inclines by 45° with respect to the directions +X and +Z. In detail, the polarization separation layer 221 inclines by 45° with respect to the planes XY and YZ.

The polarization separation layer 221 has a polarization separation characteristic that causes the polarization separation layer 221 to transmit a portion of the light incident thereon that is the portion formed of p-polarized light and reflect a portion of the incident light that is the portion formed of s-polarized light. The polarization separation layer 221 instead has a wavelength selective polarization separation characteristic that causes the polarization separation layer 221 to transmit p-polarized light and reflect s-polarized light when the light incident on the polarization separation layer 221 is blue light and causes the polarization separation layer 221 to reflect the light incident thereon irrespective of the polarization state of the light when the incident light has a wavelength longer than the wavelength of the blue light.

The first polarization separator 22 therefore transmits the blue light BLp, which is the first polarized component, out of the light source light incident on the first polarization separator 22 in the direction +X in such a way that the transmitted blue light BLp travels in the direction +X and reflects the blue light BLs, which is the second polarized component, out of the incident light source light in such a way that the reflected blue light BLs travels in the direction −Z.

The first polarization separator 22 is not limited to a prism-shaped polarization separator and may instead be a plate-shaped polarization separator including the polarization separation layer 221.

Configuration of Second Polarization Separator

The second polarization separator 23 is located in a position shifted in the direction +X from the first polarization separator 22. The blue light BLp having passed through the first polarization separator 22 enters the second polarization separator 23.

The second polarization separator 23 is a prism-shaped polarization separator, as is the first polarization separator 22, and includes the polarization separation layer 231 provided at the interface between the two prism pieces.

The polarization separation layer 231 inclines by 45° with respect to the directions +X and +Z. In detail, the polarization separation layer 231 inclines by 45° with respect to the planes XY and YZ. The polarization separation layer 231 is parallel to the polarization separation layer 221.

The polarization separation layer 231 has a wavelength selective polarization separation characteristic that causes the polarization separation layer 231 to reflect blue light, reflect the s-polarized component of light having wavelengths longer than the wavelength of the blue light, and transmit p-polarized component thereof. The second polarization separator 23 therefore reflects the blue light BLp incident from the first polarization separator 22 in the direction +X in such a way that the reflected blue light BLp travels in the direction −Z.

The second polarization separator 23 is not limited to a prism-shaped polarization separator and may instead be a plate-shaped polarization separator including the polarization separation layer 231.

Configuration of First Phase Retarder

The first phase retarder 24 is located in a position shifted in the direction −Z from the first polarization separator 22. That is, the first phase retarder 24 is located between the first polarization separator 22 and the first reflector 26 in the direction +Z.

The first phase retarder 24 is a quarter wave plate and converts the blue light BLs that is part of the light source light reflected off the first polarization separator 22 into circularly polarized blue light BLc1, which is then incident on the first light collector 25. That is, the first phase retarder 24 converts the polarization state of the light source light incident thereon.

Configuration of First Light Collector

The first light collector 25 is located between the first phase retarder 24 and the first reflector 26 in the direction +Z.

The first light collector 25 collects the blue light BLc1 incident from the first phase retarder 24 into a spot on the first reflector 26. The first light collector 25 parallelizes blue light Blc2 incident from the first reflector 26. In the example shown in FIG. 3, the first light collector 25 is formed of two lenses 251 and 252, but the number of lenses that form the first light collector 25 is not limited to a specific number.

Configuration of First Reflector

The first reflector 26 is located in a position shifted in the direction −Z from the first light collector 25. That is, the first reflector 26 is located in a position shifted in the direction −Z from the first polarization separator 22.

The first reflector 26 reflects the blue light BLc1 incident from the first light collector 25 in the direction −Z in such a way that the reflected blue light BLc1 travels in the direction +Z. The first reflector 26 includes a reflection plate 261, which diffusively reflects the light incident thereon, and a rotator 262, which rotates the reflection plate 261 around an axis of rotation Rx parallel to the direction +Z.

The blue light BLc1 incident on the reflection plate 261 is converted, when reflected off the reflection plate 261 and outputted as diffused light, into blue light BLc2, which is circularly polarized light having a polarization rotation direction opposite the polarization rotation direction of the incident blue light BLc1.

The blue light Blc2 outputted from the first reflector 26 passes in the direction +Z through the first light collector 25, which parallelizes the blue light Blc2, and the parallelized blue light Blc2 then enters the first phase retarder 24 again. The blue light BLc2 incident from the first light collector 25 on the first phase retarder 24 is converted by the first phase retarder 24 not into the blue light BLs having been incident from the first polarization separator 22 on the first phase retarder 24 but into the blue light BLp. The converted blue light BLp passes through the first polarization separator 22 in the direction +Z and enters the second color separator 31.

Configuration of Second Light Collector

The second light collector 27 is located between the second polarization separator 23 and the wavelength converter 28 in the direction +Z.

The second light collector 27 collects the blue light BLp reflected off the second polarization separator 23 in the direction −Z into a spot on the wavelength converter 28. The second light collector 27 parallelizes yellow light YLn incident from the wavelength converter 28 in the direction +Z. In the example shown in FIG. 3, the second light collector 27 is formed of two lenses 271 and 272, but the number of lenses that form the second light collector 27 is not limited to a specific number.

Configuration of Wavelength Converter

The wavelength converter 28 is located in a position shifted in the direction −Z from the second light collector 27. That is, the wavelength converter 28 is located in a position shifted in the direction −Z from the second polarization separator 23.

The wavelength converter 28 is excited with light incident thereon and outputs converted light having a wavelength different from the wavelength of the incident light. In detail, the wavelength converter 28 is a reflective wavelength converter that outputs the converted light in the direction opposite the direction in which the incident light travels. In other words, the wavelength converter 28 converts the wavelength of the incident light and outputs the converted light in the direction opposite the direction in which the incident light travels.

In the present embodiment, the wavelength converter 28 contains a yellow phosphor that is excited with blue light and emits yellow light. The wavelength converter 28 diffusively outputs as the converted light the yellow light YLn having a wavelength longer than the wavelength of the blue light BLp, which is incident along the direction −Z.

The yellow light YLn has a peak wavelength ranging, for example, from 500 to 700 nm and is nonpolarized light. That is, the yellow light YLn is light containing a green light component as a first color component and a red light component as a second color component, and the components are each a mixture of s-polarized light and p-polarized light.

The light source apparatus 2A may include a rotator that rotates the wavelength converter 28 around an axis of rotation parallel to the direction +Z. In this case, the heat dissipation efficiency of the wavelength converter 28 can be increased.

The yellow light YLn diffusively outputted from the wavelength converter 28 in the direction +Z is parallelized by the second light collector 27, and the parallelized yellow light YLn enters the second polarization separator 23.

The polarization separation layer 231 of the second polarization separator 23 has the aforementioned wavelength selective polarization separation characteristic. Therefore, out of the yellow light YLn incident on the polarization separation layer 231, s-polarized yellow light YLs is reflected off the polarization separation layer 231 in the direction −X and enters the first polarization separator 22. The polarization separation layer 221 of the first polarization separator 22 has the polarization separation characteristic that causes the polarization separation layer 221 to reflect the yellow light YLs, as described above. The yellow light YLs incident on the polarization separation layer 221 in the direction −X is therefore reflected off the first polarization separator 22 in the direction +Z and enters the first color separator 29.

On the other hand, out of the yellow light YLn incident on the polarization separation layer 231, p-polarized yellow light YLp passes through the polarization separation layer 231 in the direction +Z and enters the second phase retarder 29.

Configuration of Second Phase Retarder

The second phase retarder 29 is located in a position shifted in the direction +Z from the second polarization separator 23. The yellow light YLP having passed through the second polarization separator 23 in the direction +Z enters the second phase retarder 29.

The second phase retarder 29 is a half wave plate that converts the yellow light YLp incident thereon into the yellow light YLs. The converted yellow light YLs enters the first color separator 30.

Configuration of First Color Separator

Figure 4:
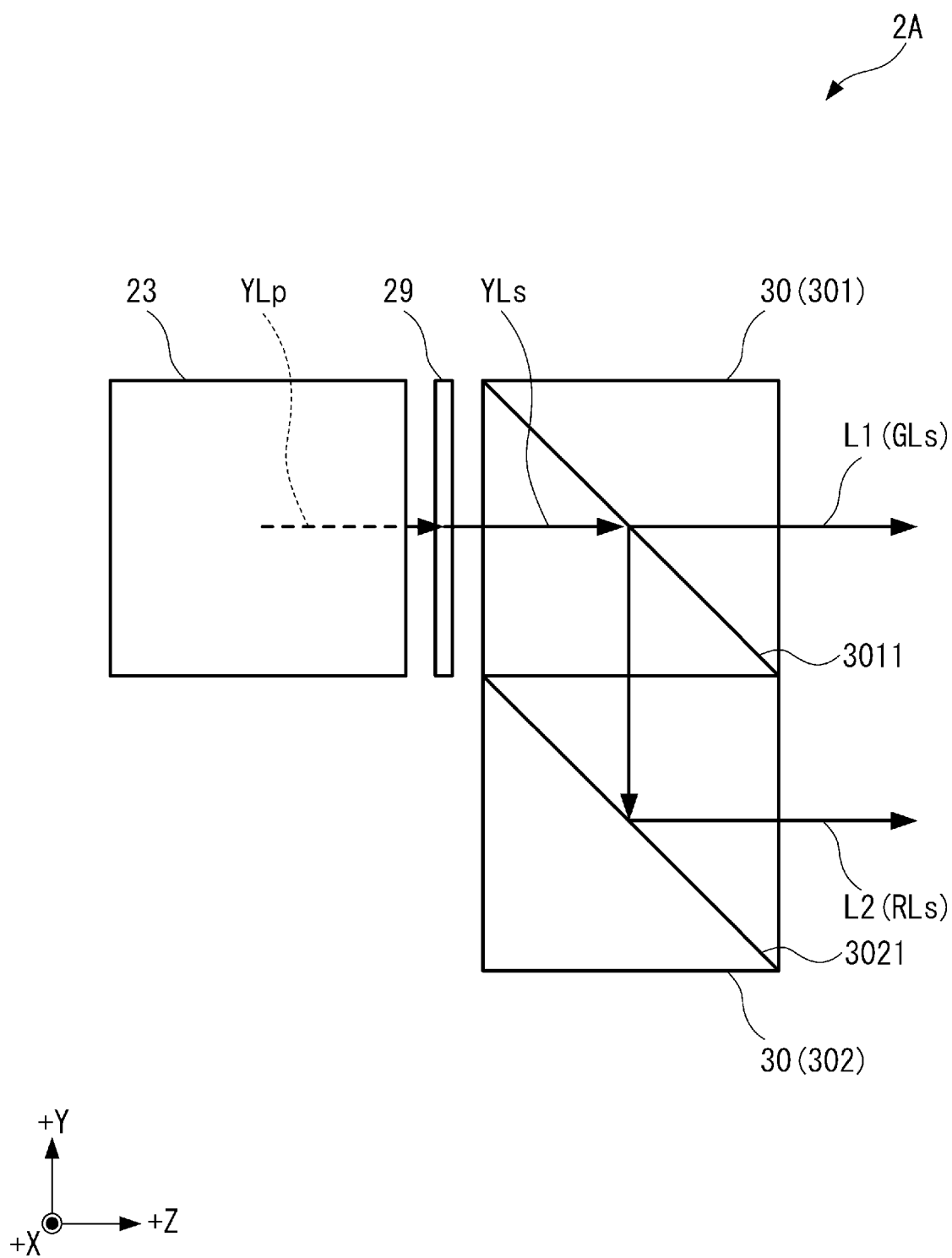
FIG. 4 is a diagrammatic view of the light source apparatus in the first embodiment viewed along a direction +X.

FIG. 4 is a diagrammatic view of the light source apparatus 2A viewed along the direction +X. In other words, FIG. 4 is a diagrammatic view of the first color separator 30 viewed along the direction +X. In FIG. 4, the configuration of part of the light source apparatus 2A is omitted.

The first color separator 30 is located in a position shifted in the direction +Z from the second phase retarder 29, as shown in FIGS. 3 and 4. The first color separator 30 separates the yellow light YLs incident from the second phase retarder 29 into green light GLs, which is the first color component, and red light RLs, which is the second color component.

The first color separator 30 includes a dichroic prism 301 and a reflection prism 302, as shown in FIG. 4.

The dichroic prism 301 is a prism-shaped color separator formed by combining two prism pieces each being a substantially right-angled isosceles triangular column with each other into a substantially box-like shape, and a color separation layer 3011 is provided at the interface between the two prism pieces.

The color separation layer 3011 inclines by 45° with respect to the directions +Y and +Z. In detail, the color separation layer 3011 inclines by 45° with respect to the planes XY and XZ.

The color separation layer 3011 is so characterized as to transmit the green light component out of the incident light in the direction +Z and reflect the red light component out of the incident light in the direction −Y. Therefore, out of the yellow light YLs incident on the dichroic prism 301, the green light GLs passes through the color separation layer 3011 in the direction +Z and exits out of the dichroic prism 301. The green light GLs then exits as the first color light flux L1 via the first light exiting section S1 in the direction +Z and enters the homogenizing apparatus 4.

On the other hand, out of the yellow light YLs incident on the dichroic prism 301, the red light RLs is reflected off the color separation layer 3011 in the direction −Y.

The dichroic prism 301 may be replaced with a dichroic mirror including the color separation layer 3011.

The reflection prism 302 is a prism-shaped reflector formed by combining two prism pieces each being a substantially right-angled isosceles triangular column with each other into a substantially box-like shape, and a reflection layer 3021, which is parallel to the color separation layer 3011, is provided at the interface between the two prism pieces.

The reflection layer 3021 reflects the red light RLs incident from the color separation layer 3011 in the direction −Y in such a way that the reflected red light RLs travels in the direction +Z. The red light RLs reflected off the reflection layer 3021 exits out of the reflection prism 302. The red light RLs then exits as the second color light flux L2 in the direction +Z via the second light exiting section S2 and enters the homogenizing apparatus 4.

The reflection prism 302 may be replaced with a reflection mirror including the reflection layer 3021.

Configuration of Second Color Separator

Figure 5:
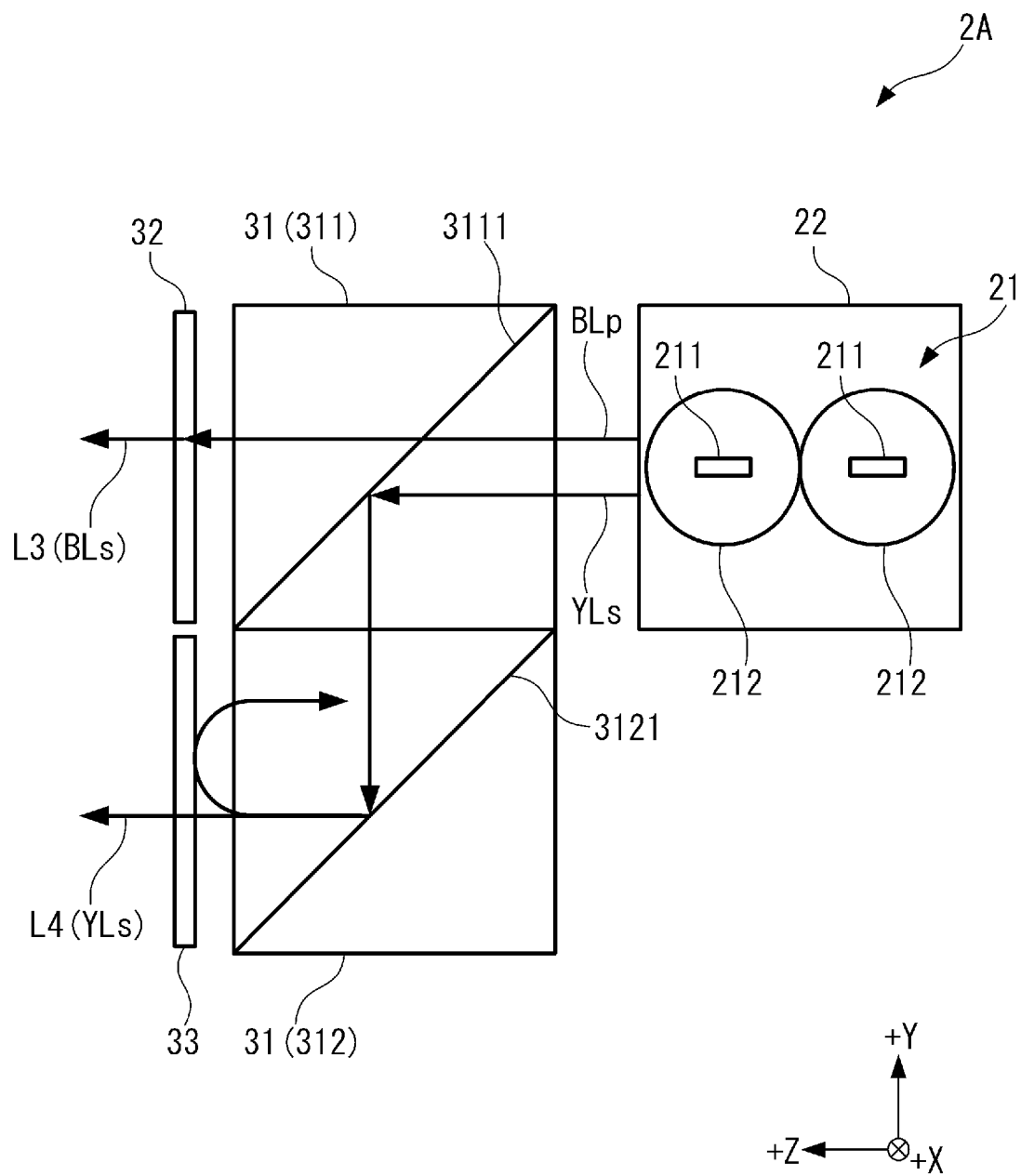
FIG. 5 is a diagrammatic view of the light source apparatus in the first embodiment viewed in a direction −X.

FIG. 5 is a diagrammatic view of the light source apparatus 2A viewed along the direction −X. In other words, FIG. 5 is a diagrammatic view of the second color separator 31, the third phase retarder 32, and the second reflector 33 viewed along the direction −X. In FIG. 5, the configuration of part of the light source apparatus 2A is omitted.

The second color separator 31 is located in a position shifted in the direction +Z from the first polarization separator 22 and separates the light incident from the first polarization separator 22 into the blue light BLp and the yellow light YLs. The second color separator 31 includes a dichroic prism 311 and a reflection prism 312, as shown in FIG. 5.

The blue light BLp and the yellow light YLs having exited out of the first polarization separator 22 enter the dichroic prism 311. The dichroic prism 311 is a prism-shaped color separator, as is the dichroic prism 301, and a color separation layer 3111 is provided at the interface between the two prism pieces.

The color separation layer 3111 inclines by 45° with respect to the directions +Y and +Z. In detail, the color separation layer 3111 inclines by 45° with respect to the planes XY and XZ.

The color separation layer 3111 is so characterized as to transmit the blue light out of the incident light in such a way that the transmitted light travels in the direction +Z and reflect color light having wavelengths longer than the wavelength of the blue light in such a way that the reflected light travels in the direction −Y. Therefore, out of the light incident from the first polarization separator 22 on the dichroic prism 311, the blue light BLp passes through the color separation layer 3111 in the direction +Z and exits out of the dichroic prism 311. The blue light BLp enters the third phase retarder 32.

On the other hand, out of the light incident from the first polarization separator 22 on the dichroic prism 311, the yellow light YLs is reflected off the color separation layer 3111 in the direction −Y.

The dichroic prism 311 may be replaced with a dichroic mirror including the color separation layer 3111. The dichroic prism 311 may instead be replaced with a polarization separator including a polarization separation layer that transmits p-polarized light and reflects s-polarized light.

The reflection prism 312 is located in a position shifted in the direction −Y from the dichroic prism 311. The yellow light YLs reflected off the color separation layer 3111 enters the reflection prism 312.

The reflection prism 312 has the same configuration as that of the reflection prism 302, and a reflection layer 3121 is provided at the interface between the two prism pieces. The reflection layer 3121 is parallel to the color separation layers 3011 and 3111 and the reflection layer 3021.

The reflection layer 3121 reflects the yellow light YLs incident from the dichroic prism 311 in the direction −Y in such a way that the reflected yellow light YLs travels in the direction +Z and is incident on the second reflector 33.

The reflection prism 312 may be replaced with a reflection mirror including the reflection layer 3121.

Configuration of Third Phase Retarder

The third phase retarder 32 is disposed in a position shifted in the direction +Z from the dichroic prism 311 and located in the optical path of the blue light BLp having exited out of the dichroic prism 311 in the direction +Z. The third phase retarder 32 is a half wave plate that converts the polarization direction of the light incident thereon and converts the blue light BLp incident from the dichroic prism 311 into the blue light BLs.

The blue light BLs having passed through the third phase retarder 32 exits as the third color light flux L3 via the third light exiting section S3 in the direction +Z and enters the homogenizer 4.

The third phase retarder 32 may instead be provided at a surface of the dichroic prism 311 that is the surface via which the blue light BLp exits.

Configuration of Second Reflector

The second reflector 33 is provided in the optical path of the fourth color light flux L4 having exited out of the reflection prism 312 in the direction +Z. The second reflector 33 is a partial reflector that transmits part of the light incident thereon and reflects the remainder. In detail, the second reflector 33 transmits part of the incident light and reflects the remainder in accordance with predetermined proportions.

Out of the yellow light YLs incident on the second reflector 33 from the reflection prism 312, part of the yellow light YLs passes through the second reflector 33, exits as the fourth color light flux L4 via the fourth light exiting section S4 in the direction +Z, and enters the homogenizer 4.

On the other hand, the remainder of the yellow light YLs incident on the second reflector 33 is reflected off the second reflector 33 and enters the reflection prism 312 again. The remainder of the yellow light YLs having entered the reflection prism 312 is reflected off the reflection layer 3121 in the direction +Y and incident on the wavelength converter 28 via the dichroic prism 311, the first polarization separator 22, the second polarization separator 23, and the second light collector 27.

The yellow phosphor contained in the wavelength converter 28 hardly absorbs yellow light externally incident thereon. The yellow light YLs incident on the wavelength converter 28 are therefore repeatedly reflected in the wavelength converter 28 to form nonpolarized yellow light YLn, which exits out of the wavelength converter 28 along with the yellow light YLn produced in the yellow phosphor. The yellow light YLn outputted from the wavelength converter 28 then enters the second polarization separator 23 via the second light collector 27, as described above.

In the present embodiment, the second reflector 33 is formed of a half-silvered mirror. The ratio between the amount of yellow light YLs passing through the second reflector 33 and the amount of yellow light YLs reflected off the second reflector 33 can be set in advance.

Configuration of Homogenizer

The homogenizer 4 irradiates the illumination receiving areas with the light outputted from the light source apparatus in a substantially uniform manner. That is, the homogenizer 4 irradiates the light modulator 6 located in the illumination receiving areas with the color light fluxes L1 to L4 outputted from the light source apparatus 2A in a substantially uniform manner. In other words, the homogenizer 4 homogenizes the illuminance at the light modulator 6 illuminated with the light outputted from the light source apparatus 2A. The homogenizer 4 includes four array sets 41 (411 to 414) and a superimposing lens 44, as shown in FIG. 1.

Configuration of Array Sets

Figure 6:
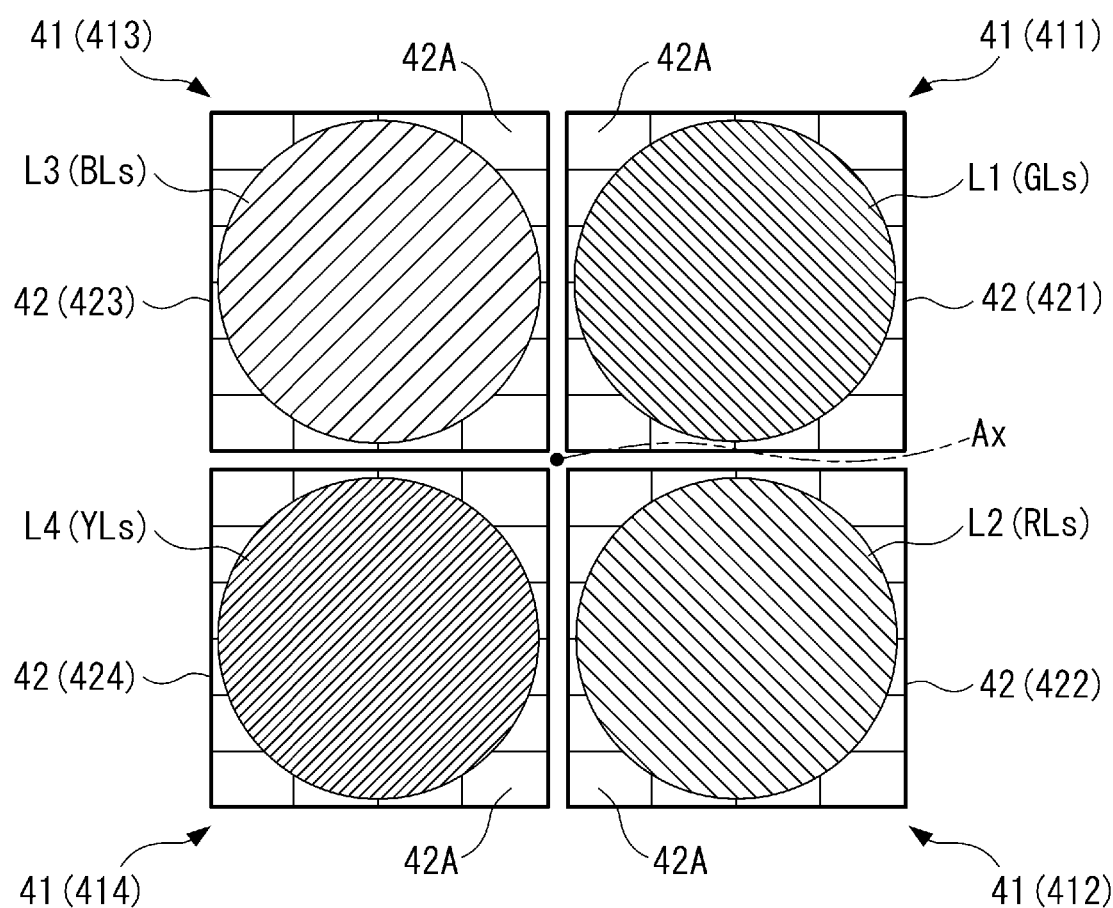
FIG. 6 is a diagrammatic view of array sets in the first embodiment viewed from the light incident side.

FIG. 6 is a diagrammatic view of a light-incident-side lens array 42 on the upstream of the array sets 41 viewed along the direction −Z, which faces the light incident side.

The four array sets 41 (411 to 414) are provided in the optical paths of the color light fluxes L1 to L4 outputted from the light source apparatus 2A, respectively, and each divide the incident color light flux into a plurality of sub-light fluxes. Specifically, the first array set 411 includes a pair of lens array 42 and 43 each disposed in a position shifted in the direction +X from the illumination optical axis Ax and shifted in the direction +Y from the illumination optical axis Ax, as shown in FIGS. 1 and 6. The first array set 411 is provided in the optical path of the first color light flux L1, and the first color light flux L1 enters the first array set 411.

The second array set 412 includes a pair of lens array 42 and 43 each disposed in a position shifted in the direction +X from the illumination optical axis Ax and shifted in the direction −Y from the illumination optical axis Ax. The second array set 412 is provided in the optical path of the second color light flux L2, and the second color light flux L2 enters the second array set 412.

The third array set 413 includes a pair of lens array 42 and 43 each disposed in a position shifted in the direction −X from the illumination optical axis Ax and shifted in the direction +Y from the illumination optical axis Ax. The third array set 413 is provided in the optical path of the third color light flux L3, and the third color light flux L3 enters the third array set 413.

The fourth array set 414 includes a pair of lens array 42 and 43 each disposed in a position shifted in the direction −X from the illumination optical axis Ax and shifted in the direction −Y from the illumination optical axis Ax. The fourth array set 414 is provided in the optical path of the fourth color light flux L4, and the fourth color light flux L4 enters the fourth array set 414.

Out of the pair of lens arrays 42 and 43 provided in each of the array sets 41, the light-incident-side lens array 42 is located on the side on which the light is incident from the light source apparatus 2A, and the light-exiting-side lens array 43 is located on the light exiting side with respect to the light-incident-side lens array 42. The light-incident-side lens array 42 and the light-exiting-side lens array 43 are integrated with each other.

The light-incident-side lens array 42 includes a plurality of lenslets 42A arranged in a matrix in a plane perpendicular to the illumination optical axis Ax. The lenslets 42A of the light-incident-side lens array 42 divide the color light flux incident thereon into a plurality of sub-light fluxes.

The green light GLs, which is the first color light flux L1 having exited via the first light exiting section S1, enters the light-incident-side lens array 42 (421) of the first array set 411, which faces the first light exiting section S1 in the direction +Z. The red light RLs, which is the second color light flux L2 having exited via the second light exiting section S2, enters the light-incident-side lens array 42 (422) of the second array set 412, which faces the second light exiting section S2 in the direction +Z. The blur light BLs, which is the third color light flux L3 having exited via the third light exiting section S3, enters the light-incident-side lens array 42 (423) of the third array set 413, which faces the third light exiting section S3 in the direction +Z. The yellow light YLs, which is the fourth color light flux L4 having exited via the fourth light exiting section S4, enters the light-incident-side lens array 42 (424) of the fourth array set 414, which faces the fourth light exiting section S4 in the direction +Z.

The color light fluxes L1 to L4 having entered the light-incident-side lens arrays 421 to 424 are divided by the plurality of lenslets 42A provided in the light-incident-side lens arrays 421 to 424 into a plurality of sub-light fluxes, and the divided plurality of sub-light fluxes enter the corresponding light-exiting-side lens arrays 43.

The light-exiting-side lens array 43 of each of the array sets 411 and 412 includes a plurality of lenslets 43A corresponding to the plurality of lenslets 42A provided in the light-incident-side lens array 42 of the same array set 411, as shown in FIG. 1. The light-exiting-side lens array 43 of each of the array sets 413 and 414 has the same configuration. The sub-light flux having exited out of each of the lenslets 42A enters the corresponding lenslet 43A. The lenslet 43A causes the sub-light flux incident thereon to enter the superimposing lens 44.

Although will be described later in detail, at least one of the array sets 411 to 414 is so disposed as to incline with respect to an imaginary plane VS perpendicular to the illumination optical axis Ax.

Configuration of Superimposing Lens

The superimposing lens 44 superimposes the plurality of sub-light fluxes incident from the light-exiting-side lens arrays 43 of the array sets 41 on the light modulator 6. That is, a predetermined position where the superimposing lens 44 superimposes the plurality of sub-light fluxes on one another is the modulation area MA of the light modulator 6 disposed in the illumination receiving area. In other words, the superimposing lens 44 superimposes the incident sub-light fluxes of the color light fluxes L1 to L4 on the modulation area MA, which is the illumination receiving area.

The plurality of sub-light fluxes of the first color light flux L1, the second color light flux L2, the third color light flux L3, and the fourth color light flux L4 having passed through the superimposing lens 44 are incident at different angles of incidence on a plurality of microlenses 621, which form a microlens array 62, which will be described later, in the light modulator 6.

Configuration of Field Lens

The field lens 5 is disposed between the homogenizer 4 and the light modulator 6 in the direction +Z. The field lens 5 converts the light incident from the light source apparatus 2A on the light modulator 6 via the homogenizer 4 into telecentric light.

Configuration of Light Modulator

The light modulator 6 modulates the light outputted from the light source apparatus 2A to form an image according to the image information, and the projector 1A is provided with one light modulator 6. In detail, the light modulator 6 modulates each of the color light fluxes outputted from the illumination optical apparatus 10A and incident on the light modulator 6 via the field lens 5 to form an image according to the image information.

The light modulator 6 includes a liquid crystal panel 61 and a microlens array 62.

Configuration of Liquid Crystal Panel

Figure 7:
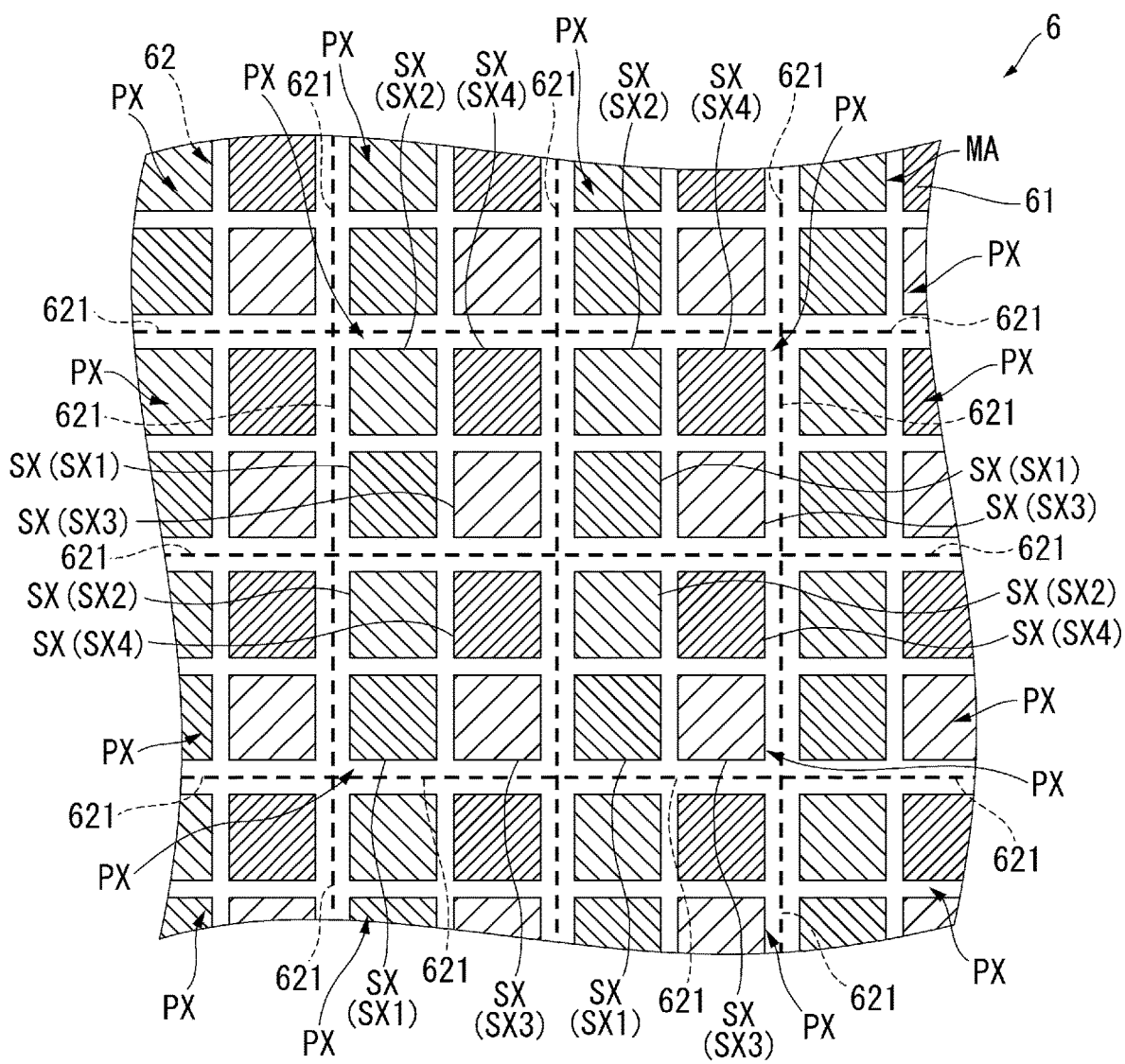
FIG. 7 is an enlarged diagrammatic view showing part of a light modulator in the first embodiment.

FIG. 7 is an enlarged diagrammatic view showing part of the light modulator 6 viewed along the direction −Z, which faces the light incident side. In other words, FIG. 7 is a diagrammatic view showing the correspondence between pixels PX provided in the liquid crystal panel 61 and the microlenses 621 provided in the microlens array 62.

The liquid crystal panel 61 includes a plurality of pixels PX arranged in a matrix in a plane perpendicular to the illumination optical axis Ax, as shown in FIG. 7. The area where the plurality of pixels PX are arranged in the liquid crystal panel 61 is the image formation area where an image is formed in the light modulator 6.

The pixels PX each include a plurality of sub-pixels SX, which modulate the corresponding color light flux. In the present embodiment, the pixels PX each include four sub-pixels SX1, SX2, SX3, and SX4.

Specifically, in one pixel PX, the sub-pixel SX1 is disposed in a position shifted in the directions −X and −Y, and the sub-pixel SX2 is disposed in a position shifted in the directions −X and +Y. Further, in one pixel PX, the sub-pixel SX3 is disposed in a position shifted in the directions +X and −Y, and the sub-pixel SX4 is disposed in a position shifted in the directions +X and +Y.

Configuration of Microlens Array

The microlens array 62 is provided on the light incident side of the liquid crystal panel 61 and guides the incident color light fluxes L1 to L4 to the corresponding sub-pixels SX. The microlens array 62 includes a plurality of microlenses 621 arranged in a matrix in a plane perpendicular to the illumination optical axis Ax and corresponding to the plurality of pixels PX. In detail, one microlens 621 is provided in correspondence with one pixel PX. That is, the illumination receiving area illuminated by the illumination optical apparatus 10A is the modulation area MA, which modulates the light incident on the light modulator 6 and is also the area where the microlens array 62 is superimposed on the image formation area of the liquid crystal panel 61 when viewed from the light incident side of the light modulator 6. The modulation area MA has an oblong shape having long sides along the direction +X and short sides along the direction +Y when viewed from the light incident side.

The color light fluxes L1 to L4 are incident on the microlenses 621 at different angles of incidence, as described above.

The microlenses 621 cause the color light fluxes L1 to L4 incident thereon to be incident on the corresponding sub-pixels SX. Specifically, the microlenses 621 each guide the first color light flux L1 to the sub-pixel SX1 out of the sub-pixels SX of the corresponding pixel PX and guide the second color light flux L2 to the sub-pixel SX2 of the corresponding pixel PX. The microlens 621 further guides the third color light flux L3 to the sub-pixel SX3 of the corresponding pixel PX and the fourth color light flux L4 to the sub-pixel SX4 of the corresponding pixel PX.

The color light fluxes L1 to L4 are thus incident on the corresponding sub-pixels SX1 to SX4, and the sub-pixels SX1 to SX4 modulate the corresponding color light fluxes L1 to L4. The incident color light modulation performed by the sub-pixels SX1 to SX4 described above is performed by the pixels PX of the liquid crystal panel 61.

Configuration of Projection Optical Apparatus

The projection optical apparatus 7 projects the light modulated by the light modulator 6. Specifically, the projection optical apparatus 7 projects an image formed as a result of the modulation of the color light fluxes incident on the liquid crystal panels 61 on the projection receiving surface that is not shown. The thus functioning projection optical apparatus 7 can be formed of a lens barrel and a unit lens including at least one lens provided in the lens barrel.

Inclination of Array Sets

The array sets 411 to 414 are so disposed as to incline with respect to the imaginary plane perpendicular to the illumination optical axis Ax. Specifically, the array sets 411 to 414 are each so disposed as to incline with the imaginary plane perpendicular to the illumination optical axis Ax in such a way that a first area the distance from which to the illumination optical axis Ax is short is shifted in the direction +Z from a second area the distance from which to the illumination optical axis Ax is longer than the distance from the first area to the illumination optical axis Ax. In other words, the array sets 411 to 414 are each so disposed as to incline with the imaginary plane perpendicular to the illumination optical axis Ax in such a way that the first area, which is located in a position facing the illumination optical axis Ax in the corresponding array set 41, is shifted in the direction +Z from the second area, which is located in a position opposite the first area with respect to the illumination optical axis Ax in the corresponding array set 41.

Figure 8:
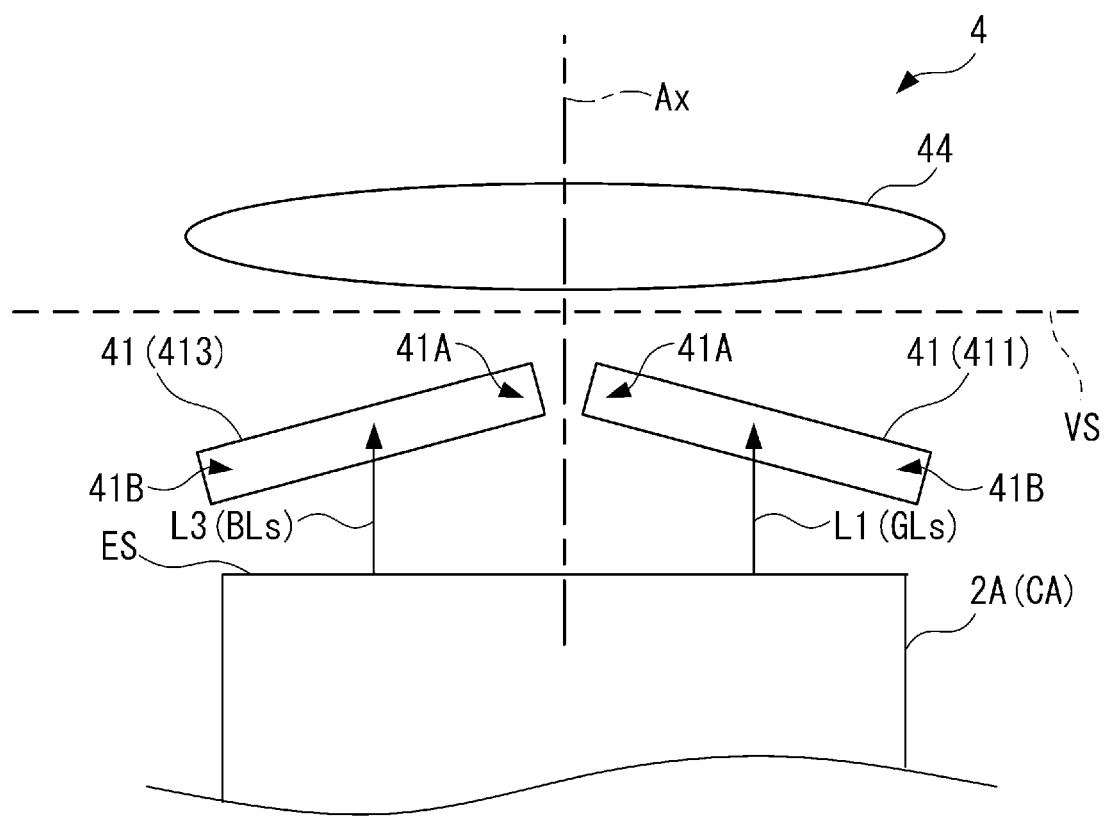
FIG. 8 is a diagrammatic view showing inclining array sets in the first embodiment.
Figure 9:
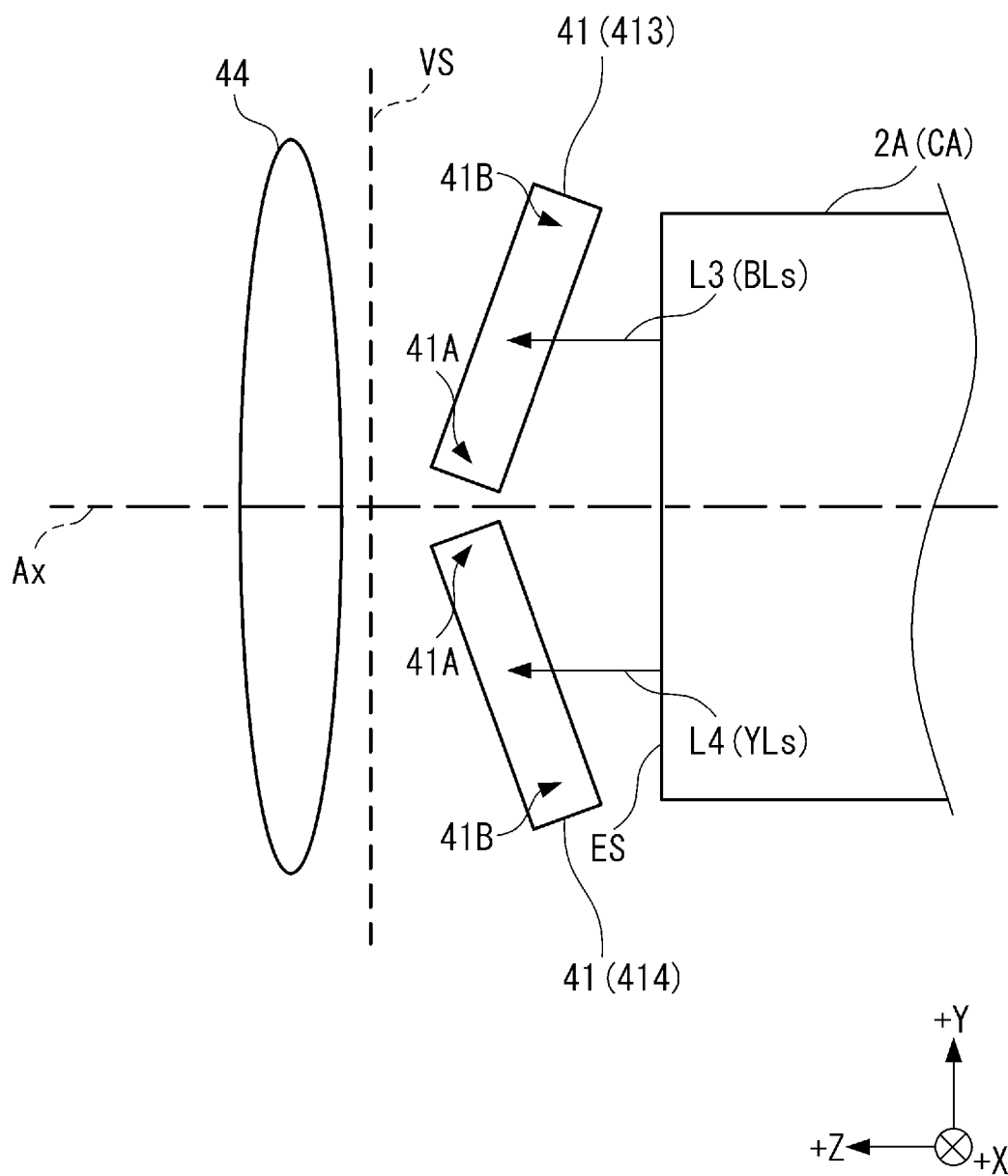
FIG. 9 is a diagrammatic view showing inclining array sets in the first embodiment.

FIGS. 8 and 9 are diagrammatic views showing the array sets 41 that incline with respect to the imaginary surface VS perpendicular to the illumination optical axis Ax. In detail, FIG. 8 is a diagrammatic view of the array sets 411 and 413 viewed along the direction +Y with the array sets caused to pivot around a pivotal axis Y, and FIG. 9 is a diagrammatic view of the array sets 413 and 414 viewed along the direction −X with the array sets caused to pivot around a pivotal axis X.

In the present embodiment, the configuration in which the array sets 41 incline with respect to the imaginary surface VS perpendicular to the illumination optical axis Ax is achieved by a configuration in which a pivotal mechanism that is not shown causes the array sets 41 to pivot around at least one of the pivotal axis Y parallel to the axis Y and the pivotal axis X parallel to the axis X, as shown in FIGS. 8 and 9. In detail, the configuration in which the array sets 41 are each caused to pivot around at least one of the pivotal axis Y and the pivotal axis X achieves the configuration in which the array set 41 is so disposed as to incline with respect to the imaginary plane VS in such a way that a first area 41A, the distance from which to the illumination optical axis Ax is short in the array set 41 is shifted in the direction +Z from a second area 41B, the distance from which to the illumination optical axis Ax is longer than the distance from the first area to the illumination optical axis Ax in the array set 41.

For example, the array sets 411 and 413 are caused to pivot around the pivotal axis Y, which is parallel to the widthwise direction of the modulation area MA, in such a way that the first area 41A is shifted in the direction +Z from the second area 41B, as shown in FIG. 8. The first array set 411 in this state is so disposed as to incline with respect to the imaginary plane VS in such a way that out of the two ends extending along the axis Y, that is, the +X-direction-side end and the −X-direction-side end, the −X-direction-side end, the distance from which to the illumination optical axis Ax is short, is shifted in the direction +Z from the +X-direction-side end, the distance from which to the illumination optical axis Ax is longer than the distance from the −X-direction-side end to the illumination optical axis Ax. Similarly, the third array set 413 is so disposed as to incline with respect to the imaginary plane VS in such a way that out of the two ends extending along the axis Y, that is, the +X-direction-side end and the −X-direction-side end, the +X-direction-side end, the distance from which to the illumination optical axis Ax is short, is shifted in the direction +Z from the −X-direction-side end, the distance from which to the illumination optical axis Ax is longer than the distance from the +X-direction-side end to the illumination optical axis Ax.

Although not shown, the second array set 412 disposed in the optical path of the second color light flux L2 and the fourth array set 414 disposed in the optical path of the fourth color light flux L4 are each caused to pivot around the pivotal axis Y in such a way that the first area 41A is shifted in the direction +Z from the second area 41B, as are the array sets 411 and 413.

As described above, the array sets 411 to 414 are so disposed as to incline with respect to the imaginary plane VS.

Further, for example, the array sets 413 and 414 are caused to pivot around the pivotal axis X, which is parallel to the lengthwise direction of the modulation area MA, in such a way that the first area 41A is shifted in the direction +Z from the second area 41B, as shown in FIG. 9. The third array set 413 in this state is so disposed as to incline with respect to the imaginary plane VS in such a way that out of the two ends extending along the axis X, that is, the +Y-direction-side end and the −Y-direction-side end, the −Y-direction-side end, the distance from which to the illumination optical axis Ax is short, is shifted in the direction +Z from the +Y-direction-side end, the distance from which to the illumination optical axis Ax is longer than the distance from the −Y-direction-side end to the illumination optical axis Ax. Similarly, the fourth array set 414 is so disposed as to incline with respect to the imaginary plane VS in such a way that out of the two ends extending along the axis X, that is, the +Y-direction-side end and the −Y-direction-side end, the +Y-direction-side end, the distance from which to the illumination optical axis Ax is short, is shifted in the direction +Z from the −Y-direction-side end, the distance from which to the illumination optical axis Ax is longer than the distance from the +Y-direction-side end to the illumination optical axis Ax.

Although not shown, the array sets 411 and 412 are each caused to pivot around the pivotal axis X in such a way that the first area 41A is shifted in the direction +Z from the second area 41B, as are the array sets 413 and 414.

As described above, the array sets 411 to 414 are so disposed as to incline with respect to the imaginary plane VS.

Further, for example, although not shown, the array sets 411 to 414 are caused to pivot around each of the pivotal axes Y and X or otherwise moved as to be disposed as follows.

The first array set 411 is so disposed as to incline with respect to the imaginary plane VS in such a way that the −X-direction-side and −Y-direction-side end of the first area 41A in the first array set 411 is shifted in the direction +Z from the +X-direction-side and +Y-direction-side end of the second area 41B in the first array set 411.

The second array set 412 is so disposed as to incline with respect to the imaginary plane VS in such a way that the −X-direction-side and +Y-direction-side end of the first area 41A in the second array set 412 is shifted in the direction +Z from the +X-direction-side and −Y-direction-side end of the second area 41B in the second array set 412.

The third array set 413 is so disposed as to incline with respect to the imaginary plane VS in such a way that the +X-direction-side and −Y-direction-side end of the first area 41A in the third array set 413 is shifted in the direction +Z from the −X-direction-side and +Y-direction-side end of the second area 41B in the third array set 413.

The fourth array set 414 is so disposed as to incline with respect to the imaginary plane VS in such a way that the +X-direction-side and +Y-direction-side end of the first area 41A in the fourth array set 414 is shifted in the direction +Z from the −X-direction-side and −Y-direction-side end of the second area 41B in the fourth array set 414.

The attitude of each of the array sets 41 that inclines with respect to the imaginary plane VS in such a way that the first area 41A is shifted in the direction +Z from the second area 41B is hereinafter referred to as a suppressed attitude.

Illuminance Unevenness Suppressed by Inclination of Third Array Set

Figure 10:
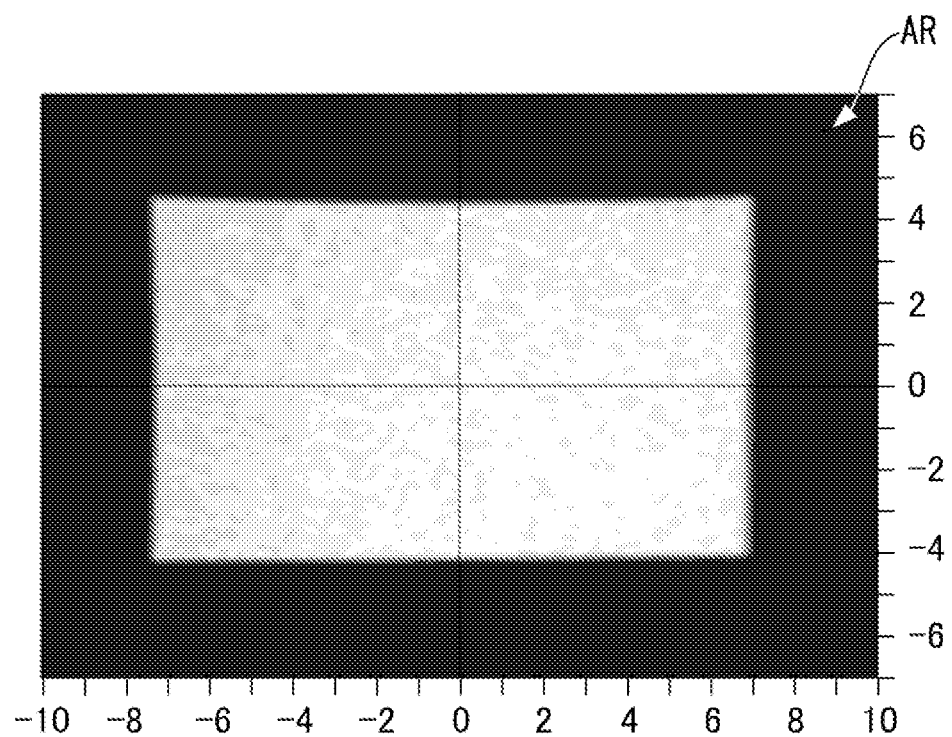
FIG. 10 shows the illuminance distribution of a third color light flux with which an illumination receiving area is irradiated when a third array set does not incline in the first embodiment.
Figure 10:
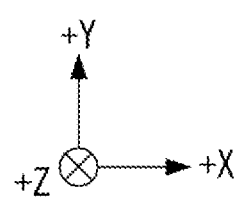
Figure 11:
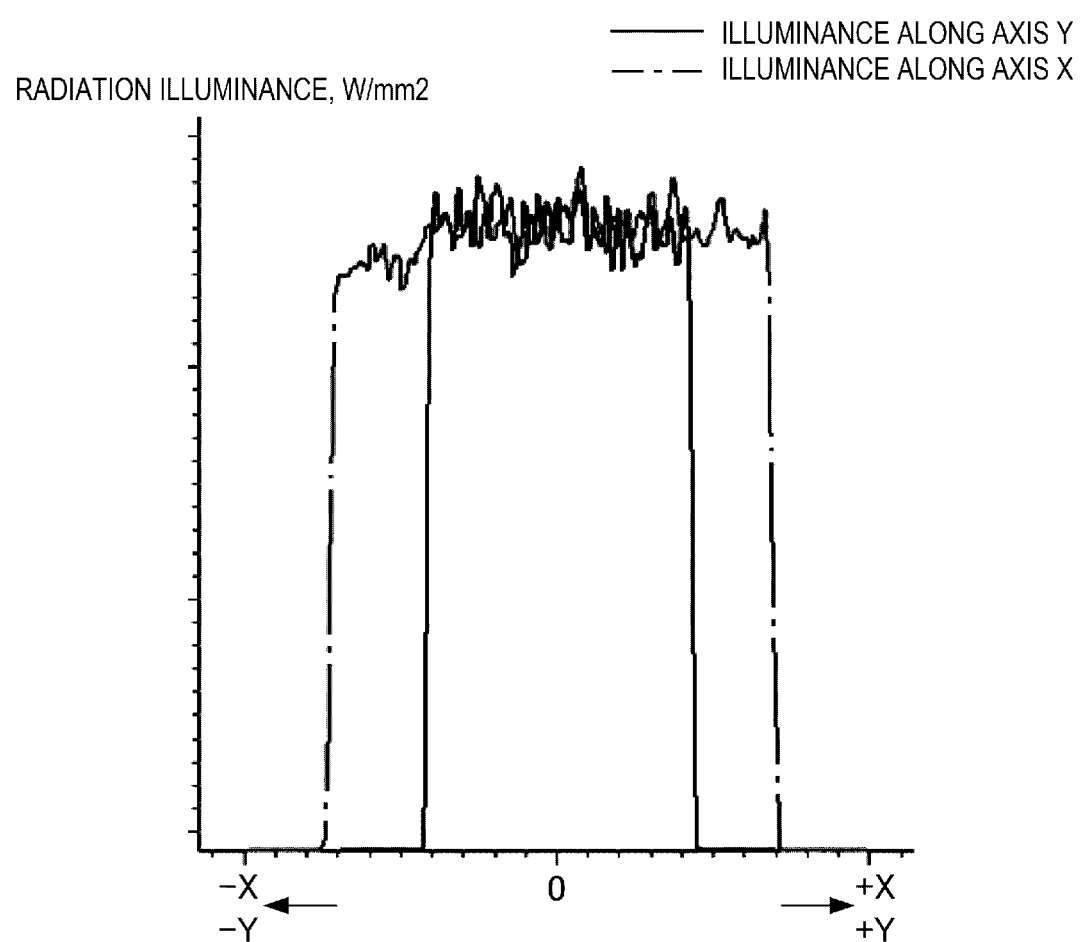
FIG. 11 shows graphs illustrating the illuminance of the third color light flux with which the illumination receiving area is irradiated when the third array set does not incline in the first embodiment.

FIG. 10 shows the illuminance distribution of the third color light flux L3 with which an illumination receiving area AR is irradiated when the third array set 413 does not incline with respect to the imaginary plane VS. FIG. 11 shows graphs illustrating the illuminance of the third color light flux L3 with which the illumination receiving area AR is irradiated in the case shown in FIG. 10.

In the case where the third array set 413 does not incline with respect to the imaginary plane VS, the difference in illuminance of the third color light flux L3 between the +Y-direction-side area of the illumination receiving area AR and the −Y-direction-side area thereof is not large, as shown in FIGS. 10 and 11. In this case, however, the difference in illuminance of the third color light flux L3 between the +X-direction-side area of the illumination receiving area AR and the −X-direction-side area thereof is large. In particular, the −X-direction-side area and +Y-direction-side area of the illumination receiving area AR is illuminated with the third color light flux L3 in such a way that the illuminance in −X-direction-side area and +Y-direction-side area of the illumination receiving area AR is lower than the illuminance in +X-direction-side area and −Y-direction-side area of the illumination receiving area AR. That is, when the third array set 413 does not incline with respect to the imaginary plane VS, illuminance unevenness occurs in such a way that the illuminance of the third array set 413 increases with distance from the −X-direction-side end and +Y-direction-side end of the illumination receiving area AR toward the +X-direction-side end and −Y-direction-side end thereof.

Figure 12:
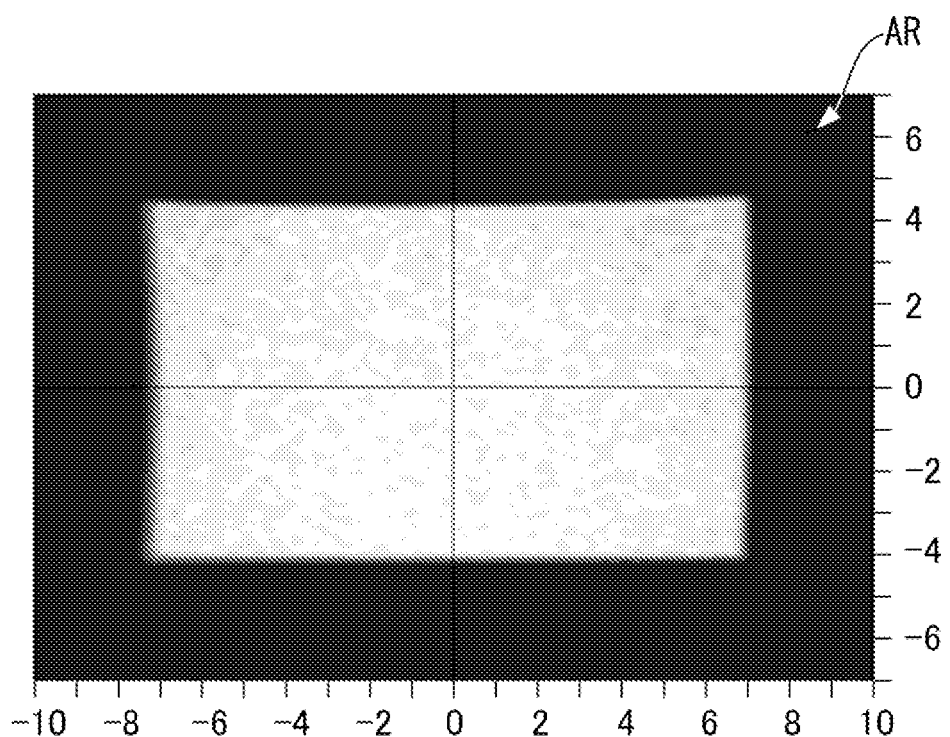
FIG. 12 shows the illuminance distribution of the third color light flux with which the illumination receiving area is irradiated when a third array set is caused to pivot around a pivotal axis Y in the first embodiment.
Figure 12:
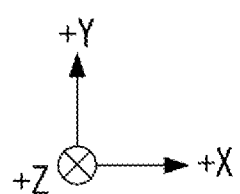
Figure 13:
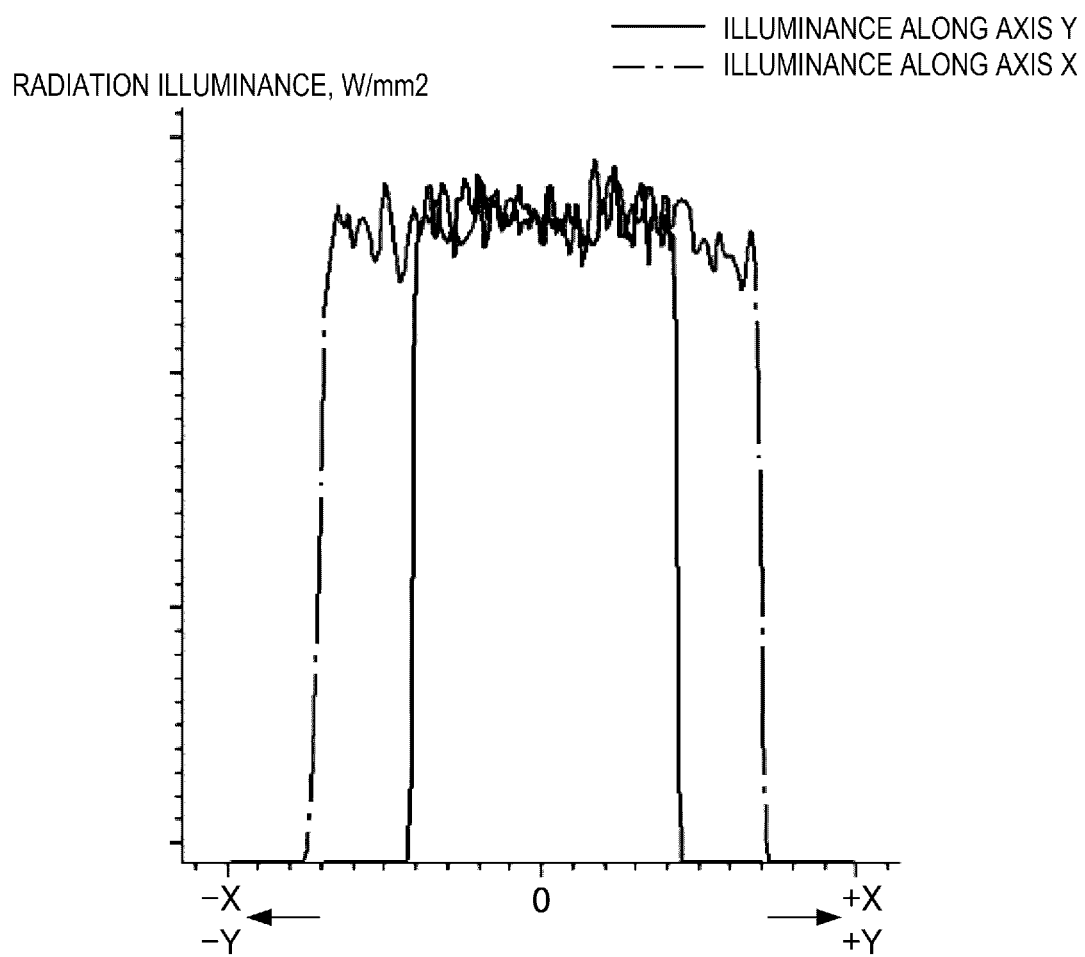
FIG. 13 shows graphs illustrating the illuminance of the third color light flux with which the illumination receiving area is irradiated when the third array set is caused to pivot around the pivotal axis Y in the first embodiment.

FIG. 12 shows the illuminance distribution of the third color light flux L3 with which the illumination receiving area AR is irradiated when the third array set 413 is caused to pivot around the pivotal axis Y to incline with respect to the imaginary plane VS. FIG. 13 shows graphs illustrating the illuminance of the third color light flux L3 with which the illumination receiving area AR is irradiated in the case shown in FIG. 11.

In contrast, when the third array set 413 is caused to pivot around the pivotal axis Y to incline with respect to the imaginary plane VS in such way that the first area 41A is shifted in the direction +Z from the second area 41B, the degree of the illuminance unevenness of the third color light flux L3 in the illumination receiving area AR decreases, as shown in FIGS. 12 and 13.

Specifically, when the third array set 413 is so caused to pivot around the pivotal axis Y that the third array set 413 has the suppressed attitude described above, the difference in illuminance of the third color light flux L3 between the −X-direction-side area of the illumination receiving area AR and the +X-direction-side area thereof is smaller than the difference when the third array set 413 does not incline. In this case, the difference in illuminance of the third color light flux L3 between the −Y-direction-side area of the illumination receiving area AR and the +Y-direction-side area thereof is small as in the case where the third array set 413 does not incline. As described above, when the third array set 413 is so caused to pivot around the pivotal axis Y that the third array set 413 has the suppressed attitude described above, the degree of the illuminance unevenness of the third color light flux L3 in the illumination receiving area AR decreases.

In this case, however, the light flux shape of the third color light flux L3 with which the illumination receiving area AR is irradiated is a slightly distorted oblong shape, as shown in FIG. 12. Therefore, to illuminate the oblong modulation area MA with the third color light flux L3, a margin necessary for the illumination of the modulation area MA with the third color light flux L3 needs to be increased.

Figure 14:
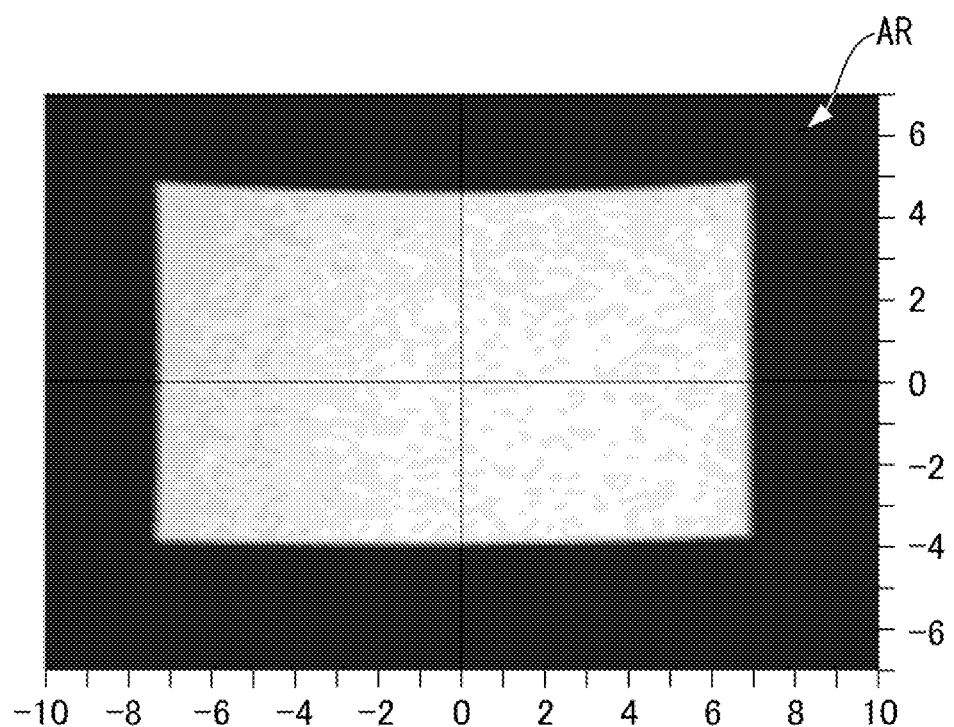
FIG. 14 shows the illuminance distribution of the third color light flux with which the illumination receiving area is irradiated when a third array set is caused to pivot around a pivotal axis X in the first embodiment.
Figure 14:
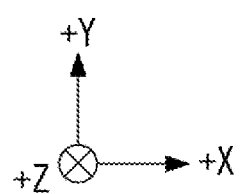
Figure 15:
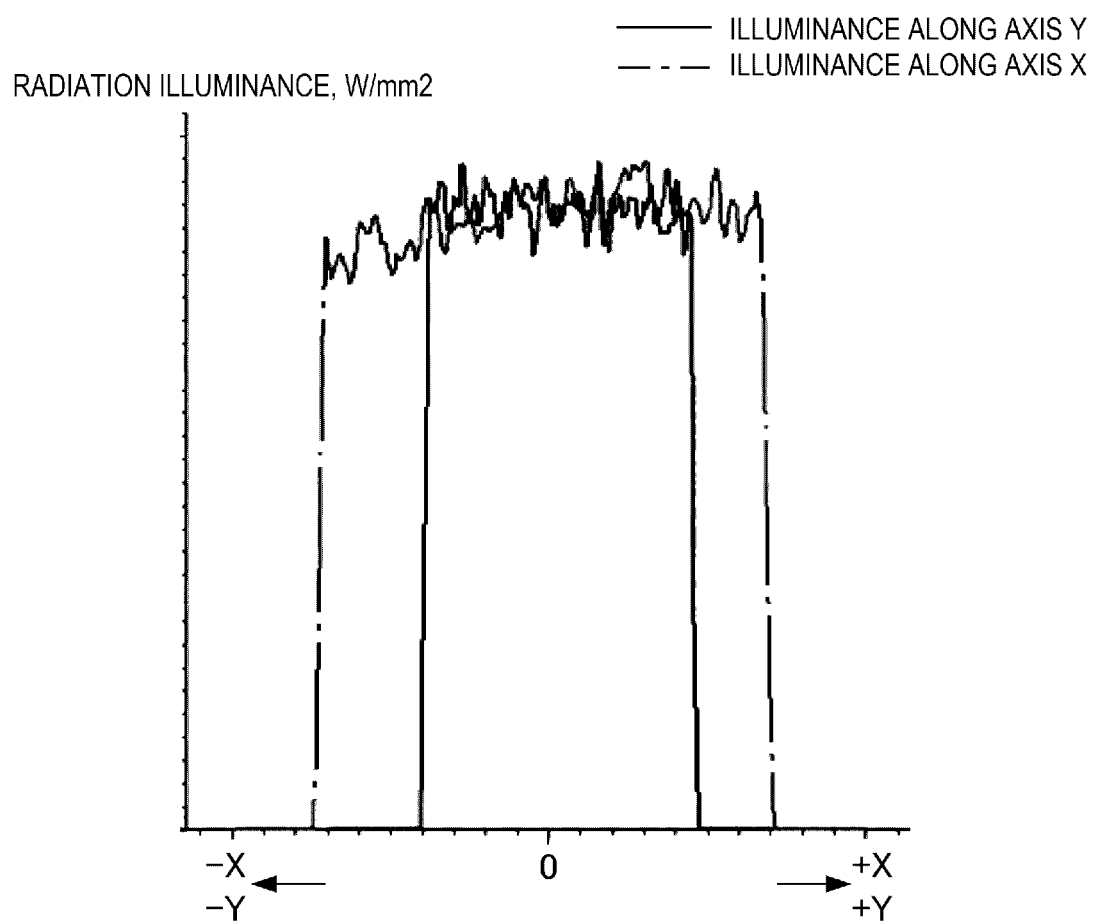
FIG. 15 shows graphs illustrating the illuminance of the third color light flux with which the illumination receiving area is irradiated when the third array set is caused to pivot around the pivotal axis X in the first embodiment.

FIG. 14 shows the illuminance distribution of the third color light flux L3 with which the illumination receiving area AR is irradiated when the third array set 413 is caused to pivot around the pivotal axis X to incline with respect to the imaginary plane VS. FIG. 15 shows graphs illustrating the illuminance of the third color light flux L3 with which the illumination receiving area AR is irradiated in the case shown in FIG. 14.

When the third array set 413 is caused to pivot around the pivotal axis X to incline with respect to the imaginary plane VS in such a way that the first area 41A is shifted in the direction +Z from the second area 41B, the degree of the illuminance unevenness of the third color light flux L3 in the illumination receiving area AR also decreases, as shown in FIGS. 14 and 15.

Specifically, when the third array set 413 is so caused to pivot around the pivotal axis X that the third array set 413 has the suppressed attitude described above, the difference in illuminance of the third color light flux L3 between the −X-direction-side area of the illumination receiving area AR and the +X-direction-side area thereof is smaller than the difference when the third array set 413 does not incline. Also in this case, the difference in illuminance of the third color light flux L3 between the −Y-direction-side area of the illumination receiving area AR and the +Y-direction-side area thereof is small as in the case where the third array set 413 does not incline. As described above, when the third array set 413 is so caused to pivot around the pivotal axis X that the third array set 413 has the suppressed attitude described above, the degree of the illuminance unevenness of the third color light flux L3 in the illumination receiving area AR decreases.

However, in the illumination receiving area AR, the difference in illuminance of the third color light flux L3 between the −X-direction-side area of the illumination receiving area AR and the +X-direction-side thereof is not smaller than the difference when the third array set 413 is caused to pivot around the pivotal axis Y to incline with respect to the imaginary plane VS. It is therefore advantageous in terms of improvement in the illuminance unevenness to cause the third array set 413 to pivot around the pivotal axis Y to incline with respect to the imaginary plane VS.

On the other hand, the distortion of the light flux shape of the third color light flux L3 with which the illumination receiving area AR is irradiated is smaller than the distortion of the light flux shape of the third color light flux L3 with which the illumination receiving area AR is irradiated when the third array set 413 is caused to pivot around the pivotal axis Y, as shown in FIG. 14. Therefore, to illuminate the oblong modulation area MA with the third color light flux L3, the margin necessary for the illumination of the modulation area MA with the third color light flux L3 can be reduced.

Figure 16:
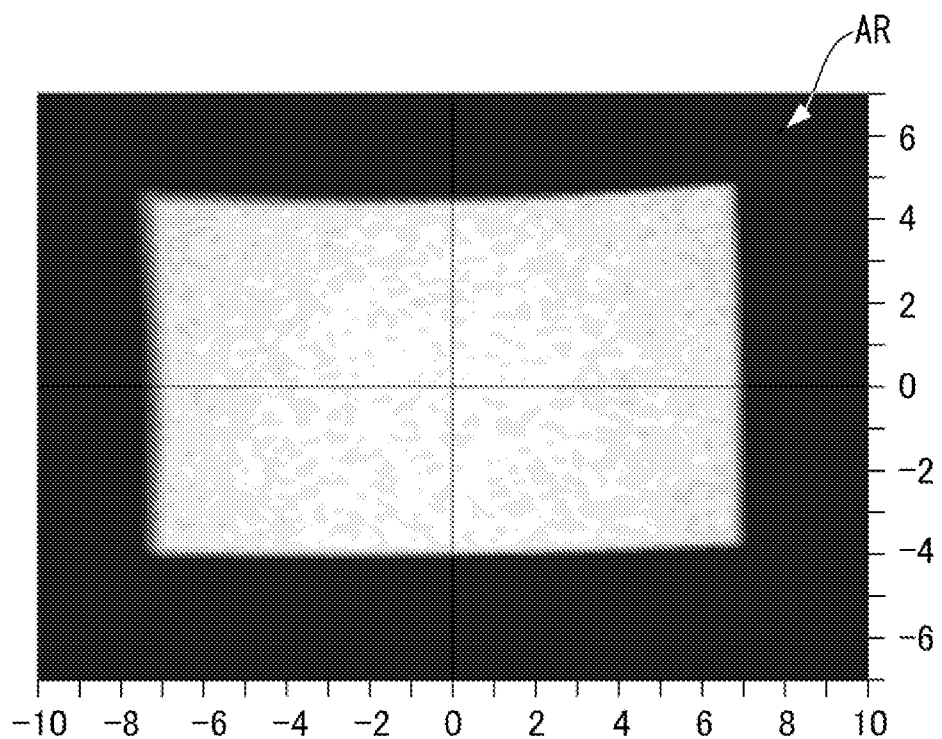
FIG. 16 shows the illuminance distribution of the third color light flux with which the illumination receiving area is irradiated when a third array set is caused to pivot around the pivotal axes X and Y in the first embodiment.
Figure 16:
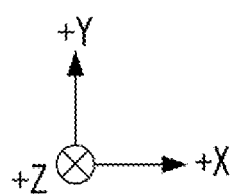
Figure 17:
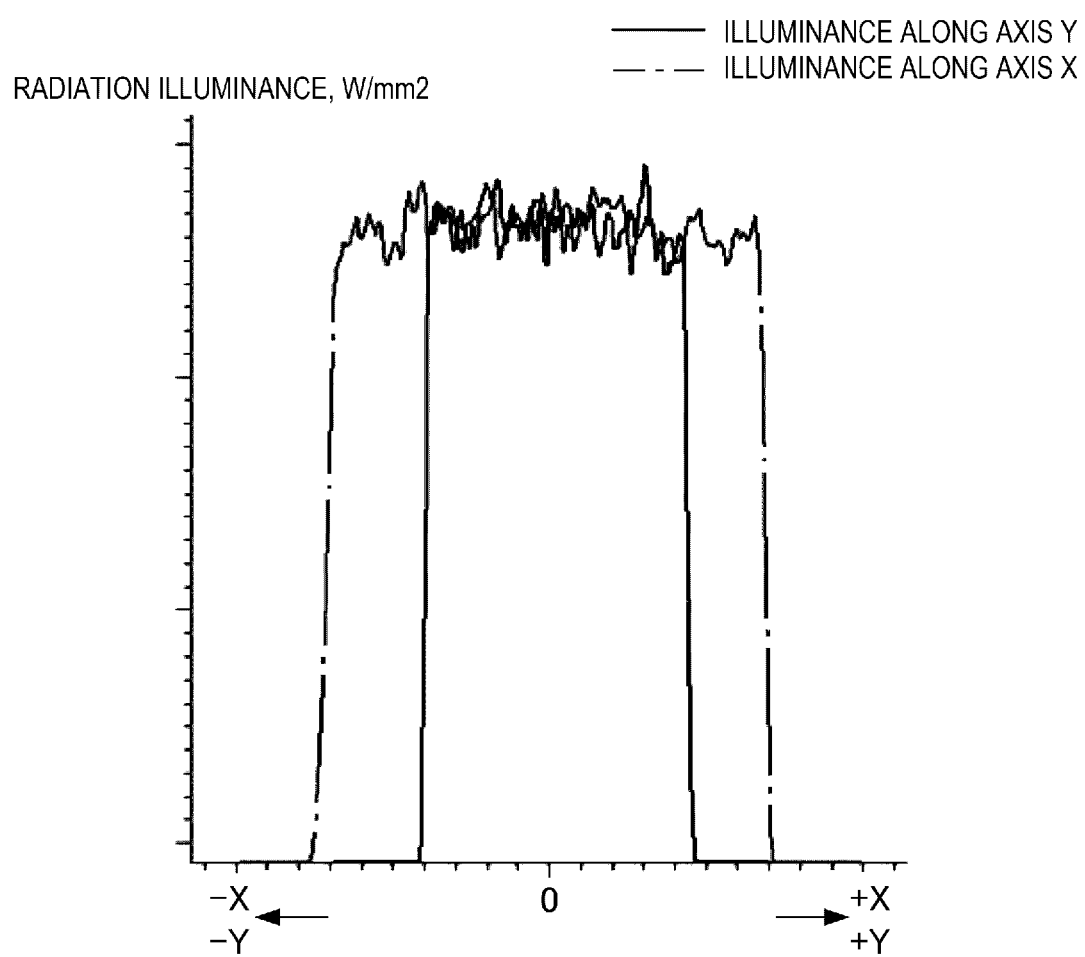
FIG. 17 shows graphs illustrating the illuminance of the third color light flux with which the illumination receiving area is irradiated when the third array set is caused to pivot around the pivotal axes X and Y in the first embodiment.

FIG. 16 shows the illuminance distribution of the third color light flux L3 with which the illumination receiving area AR is irradiated when the third array set 413 is caused to pivot around the pivotal axes X and Y to incline with respect to the imaginary plane VS. FIG. 17 shows graphs illustrating the illuminance of the third color light flux L3 with which the illumination receiving area AR is irradiated in the case shown in FIG. 16.

Further, when the third array set 413 is caused to pivot around the pivotal axes X and Y to incline with respect to the imaginary plane VS in such a way that the first area 41A is shifted in the direction +Z from the second area 41B, the degree of the illuminance unevenness of the third color light flux L3 in the illumination receiving area AR further decreases, as shown in FIGS. 16 and 17.

Specifically, when the third array set 413 is so caused to pivot around the pivotal axes X and Y that the third array set 413 has the suppressed attitude described above, the illuminance of the third color light flux L3 across the entire illumination receiving area AR becomes substantially uniform, whereby the degree of the illuminance unevenness of the third color light flux L3 in the illumination receiving area AR further decreases.

However, since the third array set 413 is caused to pivot around the pivotal axis Y, the light flux shape of the third color light flux L3 incident on the illumination receiving area AR is distorted, as shown in FIG. 16. Therefore, to illuminate the rectangular modulation area MA with the third color light flux L3, the margin necessary for the illumination of the modulation area MA with the third color light flux L3 needs to be increased.

Although not shown, when the third array set 413 is caused to pivot around at least one of the pivotal axes Y and X to incline with respect to the imaginary plane VS in such a way that the first area 41A is shifted in the direction −Z from the second area 41B, the degree of the illuminance unevenness of the third color light flux L3 in the illumination receiving area AR does not decrease. In other words, when the third array set 413 is caused to incline with respect to the imaginary plane VS in such way that the second area 41B is shifted in the direction +Z from the first area 41A, the degree of the illuminance unevenness of the third color light flux L3 in the illumination receiving area AR does not decrease.

For example, when the third array set 413 is caused to pivot around the pivotal axis Y to incline with respect to the imaginary plane VS in such way that the first area 41A is shifted in the direction −Z from the second area 41B, the difference in illuminance of the third color light flux L3 between the −X-direction-side area of the illumination receiving area AR and the +X-direction-side area thereof is greater than the difference when the third array set 413 does not incline. That is, in this case, the degree of the illuminance unevenness of the third color light flux L3 in the illumination receiving area AR does not decrease.

For example, when the third array set 413 is caused to pivot around the pivotal axis X to incline with respect to the imaginary plane VS in such a way that the first area 41A is shifted in the direction −Z from the second area 41B, the difference in illuminance of the third color light flux L3 between the −X-direction-side area of the illumination receiving area AR and the +X-direction-side area thereof is not greater than the difference when the third array set 413 does not incline. In this case, however, the difference in illuminance of the third color light flux L3 between the −Y-direction-side area of the illumination receiving area AR and the +Y-direction-side area thereof increases. That is, in this case, the degree of the illuminance unevenness of the third color light flux L3 in the illumination receiving area AR does not decrease.

As described above, to suppress the occurrence of the illuminance unevenness of the third color light flux L3 in the illumination receiving area AR, the third array set 413 needs to incline with respect to the imaginary plane VS in such a way that the first area 41A in the third array set 413 is shifted in the direction +Z from the second area 41B in the third array set 413.

Inclination of Other Array Sets

Out of the array sets 411 to 414, inclining the other array sets, 411, 412, and 414 excluding the third array set 413 described above with respect to the imaginary plane VS as well as the third array set 413 allows a decrease in the illuminance unevenness of the color light fluxes L1, L2, and L4 in the illumination receiving area AR.

In the present embodiment, the first array set 411 is caused to pivot around at least of the pivotal axes X and Y to incline with respect to the imaginary plane VS in such a way that the first area 41A in the first array set 411 is shifted in the direction +Z from the second area 41B in the first array set 411. Occurrence of the illuminance unevenness of the first color light flux L1 in the illumination receiving area AR is thus suppressed.

The second array set 412 is caused to pivot around at least of the pivotal axes X and Y to incline with respect to the imaginary plane VS in such a way that the first area 41A in the second array set 412 is shifted in the direction +Z from the second area 41B in the second array set 412. Occurrence of the illuminance unevenness of the second color light flux L2 in the illumination receiving area AR is thus suppressed.

Similarly, the fourth array set 414 is caused to pivot around at least of the pivotal axes X and Y to incline with respect to the imaginary plane VS in such a way that the first area 41A in the fourth array set 414 is shifted in the direction +Z from the second area 41B in the fourth array set 414. Occurrence of the illuminance unevenness of the fourth color light flux L4 in the illumination receiving area AR is thus suppressed.

Effects of First Embodiment

The projector 1A according to the present embodiment described above can provide the effects below.

The illumination optical apparatus 10A includes the light source apparatus 2A, which outputs light in the direction +Z, which is the first direction along the illumination optical axis Ax, and the homogenizer 4, which irradiates the illumination receiving area AR with the light outputted from the light source apparatus 2A in a substantially uniform manner.

The light source apparatus 2A includes the first light exiting section S1, via which the first color light flux L1 exits, the second light exiting section S2, via which the second color light flux L2 exits, the third light exiting section S3, via which the third color light flux L3 exits, and the fourth light exiting section S4, via which the fourth color light flux L4 exits. The first light exiting section S1, the second light exiting section S2, the third light exiting section S3, and the fourth light exiting section S4 are provided in positions different from one another.

The homogenizer 4 includes the first array set 411, the second array set 412, the third array set 413, the fourth array set 414, and the superimposing lens 44.

When the directions +X and +Y are two directions perpendicular to the direction +Z and perpendicular to each other, the first array set 411 includes the pair of lens arrays 42 and 43, which are each disposed in a position shifted in the direction +X and the direction +Y from the illumination optical axis Ax. The first color light flux L1 enters the first array set 411. The second array set 412 includes the pair of lens arrays 42 and 43, which are each disposed in a position shifted in the direction +X and the direction −Y from the illumination optical axis Ax. The second color light flux L2 enters the second array set 412. The third array set 413 includes the pair of lens arrays 42 and 43, which are each disposed in a position shifted in the direction −X and the direction +Y from the illumination optical axis Ax. The third color light flux L3 enters the third array set 413. The fourth array set 414 includes the pair of lens arrays 42 and 43, which are each disposed in a position shifted in the direction −X and the direction −Y from the illumination optical axis Ax. The fourth color light flux L4 enters the fourth array set 414.

The superimposing lens 44 superimposes the first color light flux L1 having passed through the first array set 411, the second color light flux L2 having passed through the second array set 412, the third color light flux L3 having passed through the third array set 413, and the fourth color light flux L4 having passed through the fourth array set 414 on the illumination receiving area.

The first array set 411, the second array set 412, the third array set 413, and the fourth array set 414 each have the first area 41A and the second area 41B, the distance from which to the illumination optical axis Ax is longer than the distance from the first area 41A to the illumination optical axis Ax.

At least one of the first array set 411, the second array set 412, the third array set 413, and the fourth array set 414 inclines with respect to the imaginary plane VS perpendicular to the illumination optical axis Ax in such a way that the first area 41A is shifted in the direction +Z from the second area 41B.

The configuration described above can suppress illuminance unevenness of the color light flux passing through the at least one array set described above that occurs in the illumination receiving area AR.

The first light exiting section S1 is located in a position shifted in the direction +X and the direction +Y from the illumination optical axis Ax. The second light exiting section S2 is located in a position shifted in the direction +X and the direction −Y from the illumination optical axis Ax. The third light exiting section S3 is located in a position shifted in the direction −X and the direction +Y from the illumination optical axis Ax. The fourth light exiting section S4 is located in a position shifted in the direction −X and the direction −Y from the illumination optical axis Ax.

The configuration described above readily allows the first light exiting section S1 to face the first array set 411 and the second light exiting section S2 to face the second array set 412. The configuration described above also readily allows the third light exiting section S3 to face the third array set 413 and the fourth light exiting section S4 to face the fourth array set 414. The color light fluxes L1, L2, L3, and L4 are therefore readily allowed to enter the corresponding array sets 411 to 414.

The first color light flux L1, the second color light flux L2, the third color light flux L3, and the fourth color light flux L4 outputted by the light source apparatus 2A are color light fluxes that belong to wavelength bands different from one another. The first array set 411, the second array set 412, the third array set 413, and the fourth array set 414 each incline with respect to the imaginary plane VS in such a way that the first area 41A is shifted in the direction +Z from the second area 41B. That is, the four array sets 411 to 414 incline with respect to the imaginary plane VS in such a way that all the four array sets 411 to 414 each have the suppressed attitude described above.

The configuration described above can suppress occurrence of illuminance unevenness of the color light flux L1 to L4 in the illumination receiving area AR. As a result, the illumination receiving area AR and in turn the modulation area MA can be uniformly illuminated with the color light fluxes L1 to L4. The modulation area MA can therefore be uniformly illuminated with the color light fluxes L1 to L4, whereby occurrence of color unevenness in a projected image can be suppressed.

The color light fluxes L1 to L4 outputted by the light source apparatus 2A are as follows: The first color light flux L1 is the green light; the second color light flux L2 is the red light; the third color light flux L3 is the blue light; and the fourth color light flux L4 is the yellow light.

The configuration described above, in which the light modulator 6 described above is provided at the illumination receiving area AR of the illumination optical apparatus 10A, allows the light modulator 6 to form an image having high luminance and reduced color unevenness.

The light source apparatus 2A includes the light source section 21, the first polarization separator 22, the second polarization separator 23, the first phase retarder 24, the first reflector 26, the wavelength converter 28, the second phase retarder 29, the first color separator 30, the second color separator 31, and the third phase retarder 32.

The light source section 21 outputs the light source light. The first polarization separator 22 transmits the blue light BLp, which is the first polarized component, out of the light source light incident on the first polarization separator 22 in the direction +X in such a way that the transmitted blue light BLp travels in the direction +X and reflects the blue light BLs, which is the second polarized component, out of the incident light source light in such a way that the reflected blue light BLs travels in the direction −Z. The second polarization separator 23 is located in a position shifted in the direction +X from the first polarization separator 22 and reflects the blue light BLp incident on the second polarization separator 23 in the direction +X in such a way that the reflected blue light BLp travels in the direction −Z. The first reflector 26 is located in a position shifted in the direction −Z from the first polarization separator 22 and reflects the incident blue light, which is the light source light, in such a way that the reflected blue light travels in the direction +Z. The first phase retarder 24 is located between the first polarization separator 22 and the first reflector 26 in the direction +Z and converts the polarization state of the blue light, which is the light source light. The wavelength converter 28 is located in a position shifted in the direction −Z from the second polarization separator 23, converts the wavelength of the blue light BLp incident in the direction −Z, and outputs the nonpolarized yellow light YLn, which is the converted light, in the direction +Z. The second phase retarder 29 is a half wave plate which is located in a position shifted in the direction +Z from the second polarization separator 23 and on which the yellow light YLp having passed through the second polarization separator 23 is incident. The first color separator 30 is located in a position shifted in the direction +Z from the second phase retarder 29 and separates the yellow light YLs incident from the second phase retarder 29 into the green light GLs, which is the first color light flux L1, and the red light RLs, which is the second color light flux L2. The second color separator 31 is located in a position shifted in the direction +Z from the first polarization separator 22 and separates the light incident from the first polarization separator 22 in the direction +Z into the third color light flux L3 and the fourth color light flux L4. The third phase retarder 32 is a half wave plate that is located in the optical path of the third color light flux L3 separated by the second color separator 31, converts the polarization direction of the third color light flux L3, and outputs the converted third color light flux L3.

The second polarization separator 23 transmits in the direction +Z the yellow light YLp, which is the first polarized component, out of the yellow light YLn incident in the direction +Z on the second polarization separator 23 to cause the yellow light YLp to enter the second phase retarder 29 and reflects the yellow light YLs, which is the second polarized component, in the direction −X. The first polarization separate 22 transmits the blue light BLp incident thereon in the direction +Z to cause the blue light BLp to enter the second color separator 31 and reflects the yellow light YLs incident thereon in the direction −Z to cause the yellow light YLs to enter the second color separator 31.

According to the configuration described above, the light source apparatus 2A can output the green light, the red light, the blue light, and the yellow light that are linearly polarized light fluxes polarized in the same polarization direction and spatially separated from one another as the first color light flux L1, the second color light flux L2, the third color light flux L3, and the fourth color light flux L4, respectively.

The light source apparatus 2A includes the second reflector 33 as a partial reflector that is provided in the optical path of the fourth color light flux L4 having exited out of the second color separator 31, transmits part of the fourth color light flux L4 incident on the second reflector 33, and reflects the remainder of the fourth color light flux L4.

The configuration described above can reduce the amount of yellow light YLs outputted as the fourth color light flux L4 and increase the amount of green light GLs outputted as the first color light flux L1 and the amount of red light RLs outputted as the second color light flux L2. Therefore, when the illumination optical apparatus 10A is used in the projector 1A, a situation in which a projected image has too high luminance can be suppressed, and the color reproducibility of the projected image can be improved.

The array sets 411 to 414 are caused to pivot around at least one of the pivotal axis X parallel to the axis X and the pivotal axis Y parallel to the axis Y to incline with respect to the imaginary plane VS.

The configuration described above allows the array sets 411 to 414 to readily incline with respect to the imaginary plane VS in such a way that the first area 41A is shifted in the direction +Z from the second area 41B, as described above. The thus inclined color light fluxes L1 to L4 can effectively suppress illuminance unevenness of the color light fluxes passing through the inclined array sets that occurs in the illumination receiving area AR.

The illumination receiving area AR formed by the illumination optical apparatus 10A is an oblong area having long sides parallel to the direction +X and short sides parallel to the direction +Y when viewed along the direction −Z, which faces the light incident side. The array sets 411 to 414 are caused to pivot around at least the pivotal axis Y to incline with respect to the imaginary plane VS.

In other words, the illumination receiving area AR is an oblong area having long sides parallel to one of the axes X and Y and short sides parallel to the other axis. The array sets 411 to 414 are so disposed as to incline with respect to the imaginary plane VS in such a way that out of the two ends extending along the axis Y parallel to the short side, that is, out of one end and the other end in the axis X parallel to the long sides, the one end the distance from which to the illumination optical axis Ax is short is shifted in the direction +Z from the other end the distance from which to the illumination optical axis Ax is longer than the distance from the one end to the illumination optical axis Ax.

The configuration described above can effectively suppress occurrence of illuminance unevenness in the illumination receiving area AR having long sides parallel to the pivotal axis X and short sides parallel to the pivotal axis Y, as compared with a case where the array sets 411 to 414 are caused to pivot around the pivotal axis X to incline with respect to the imaginary plane VS in such a way that the first area 41A is shifted in the direction +Z from the second area 41B.

The projector 1A includes the illumination optical apparatus 10A, the light modulator 6, which has the modulation area MA, which modulates the light incident from the illumination optical apparatus 10A, and the projection optical apparatus 7, which projects the light modulated by the light modulator 6. The modulation area MA is located at the illumination receiving area AR. That is, the illumination receiving area AR formed by the illumination optical apparatus 10A is the modulation area MA.

The configuration described above can suppress occurrence of color unevenness in a projected image, as described above. Further, since the color light fluxes L1 to L4 outputted by the illumination optical apparatus 10A are linearly polarized light fluxes having the same polarization direction, it is unnecessary to provide a polarization converter that aligns the polarization directions of the light fluxes incident thereon with one another and outputs the light fluxes having the same polarization direction. The size of the illumination optical apparatus 10A and in turn the projector 1A can therefore be reduced.

Second Embodiment

A second embodiment of the present disclosure will be described below.

The projector according to the present embodiment has the same configuration as that of the projector 1A according to the first embodiment but differs from the projector 1A in that a different color light flux is outputted as the fourth color light flux L4 and part of the four array sets is caused to incline. In the following description, the same or substantially the same portions as those having been already described have the same reference characters and will not be described.

Figure 18:
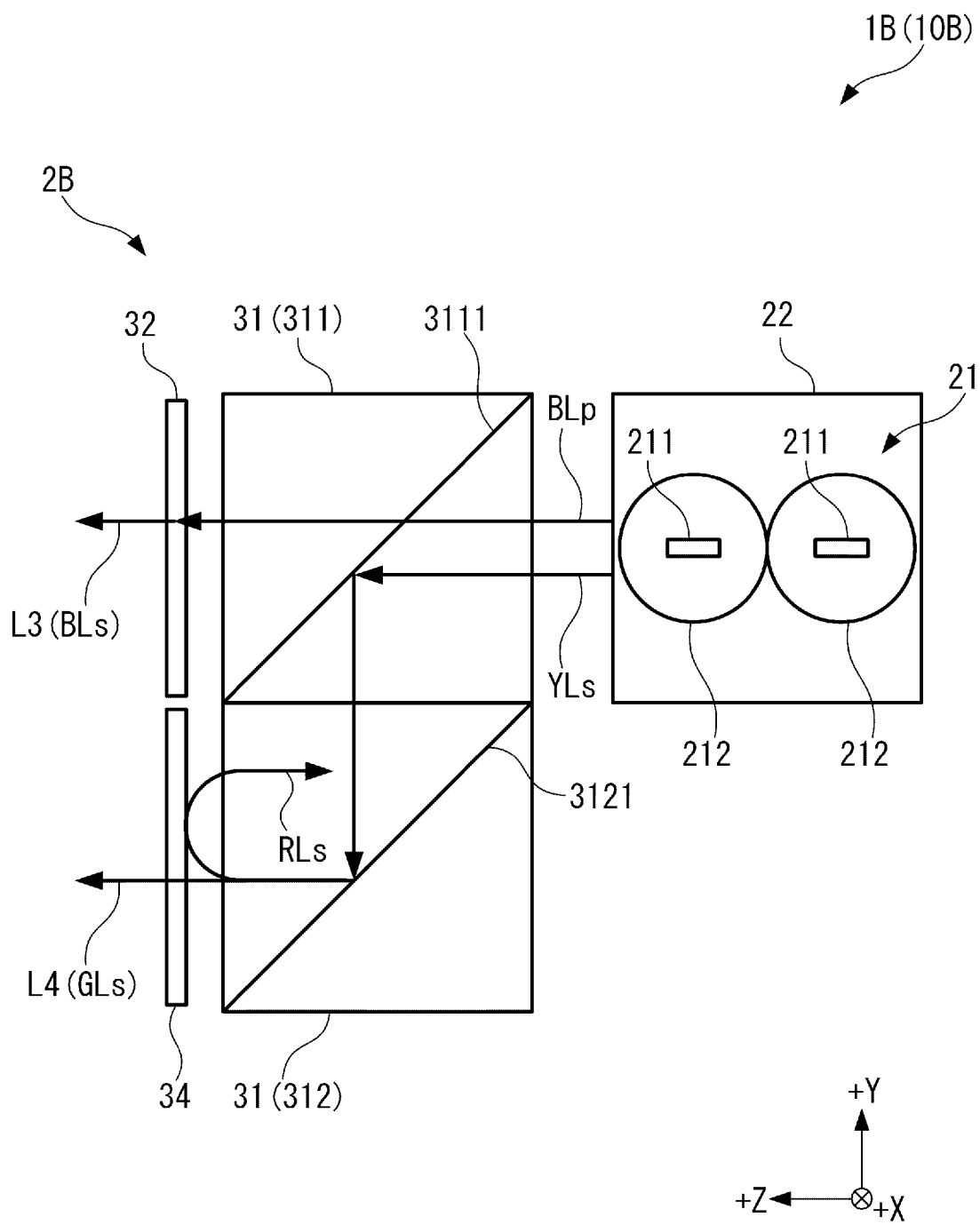
FIG. 18 is a diagrammatic view of a light source apparatus provided in a projector according to a second embodiment and viewed along the direction −X.

FIG. 18 is a diagrammatic view of part of the configuration of a light source apparatus 2B provided in a projector 1B according to the present embodiment and viewed along the direction −X. In detail, FIG. 18 is a diagrammatic view of a third color separator 34 provided in the light source apparatus 2B and viewed along the direction −X.

The projector 1B according to the present embodiment has the same configuration and function as those of the projector 1A except that the illumination optical apparatus 10A is replaced with an illumination optical apparatus 10B.

The illumination optical apparatus 10B includes the light source apparatus 2B in place of the light source apparatus 2A.

The light source apparatus 2B has the same configuration and function as those of the light source apparatus 2A except that the second reflector 33 is replaced with the third color separator 34.

The third color separator 34 is provided in the optical path of the fourth color light flux L4 separated by the second color separator 31. The third color separator 34 transmits the green light component, which is the first color component, out of the light incident on the third color separator 34 and reflects the red light component, which is the second color component, out of the incident light. That is, out of the yellow light YLs incident from the second color separator 31, the third color separator 34 transmits in the direction +Z the green light GLs, which is light that belongs to the same wavelength band to which the first color light flux L1 belongs and reflects in the direction −Z the red light RLs, which is light that belongs to the same wavelength band to which the second color light flux L2 belongs. The third color separator 34 can be formed, for example, of a dichroic mirror.

The green light GLs having passed through the third color separator 34 exits as the fourth color light flux L4 via the fourth light exiting section S4 and travels to the homogenizer 4.

On the other hand, the red light RLs reflected off the third color separator 34 in the direction −Z enters the reflection prism 312. The red light RLs then enters the wavelength converter 28 via the second color separator 31, the first polarization separator 22, the second polarization separator 23, and the second light collector 27, as does the yellow light YLs reflected off the second reflector 33 in the light source apparatus 2A.

Since the yellow phosphor contained in the wavelength converter 28 hardly absorbs yellow light externally incident thereon, as described above, the yellow phosphor does not absorb the red light RLs. The red light RLs having entered the wavelength converter 28 therefore becomes nonpolarized red light after reflected multiple times in the wavelength converter 28 and exits along with the yellow light YLn produced in the yellow phosphor out of the wavelength converter 28.

Out of the red light having exited out of the wavelength converter 28, the s-polarized red light RLs is reflected off the third color separator and returns to the wavelength converter 28, whereas the p-polarized red light passes through the second polarization separator 23 in the direction +Z, enters the second phase retarder 29, in turn exits as the second color light flux L2 via the second light exiting section S2, and enters the homogenizer 4.

Figure 19:
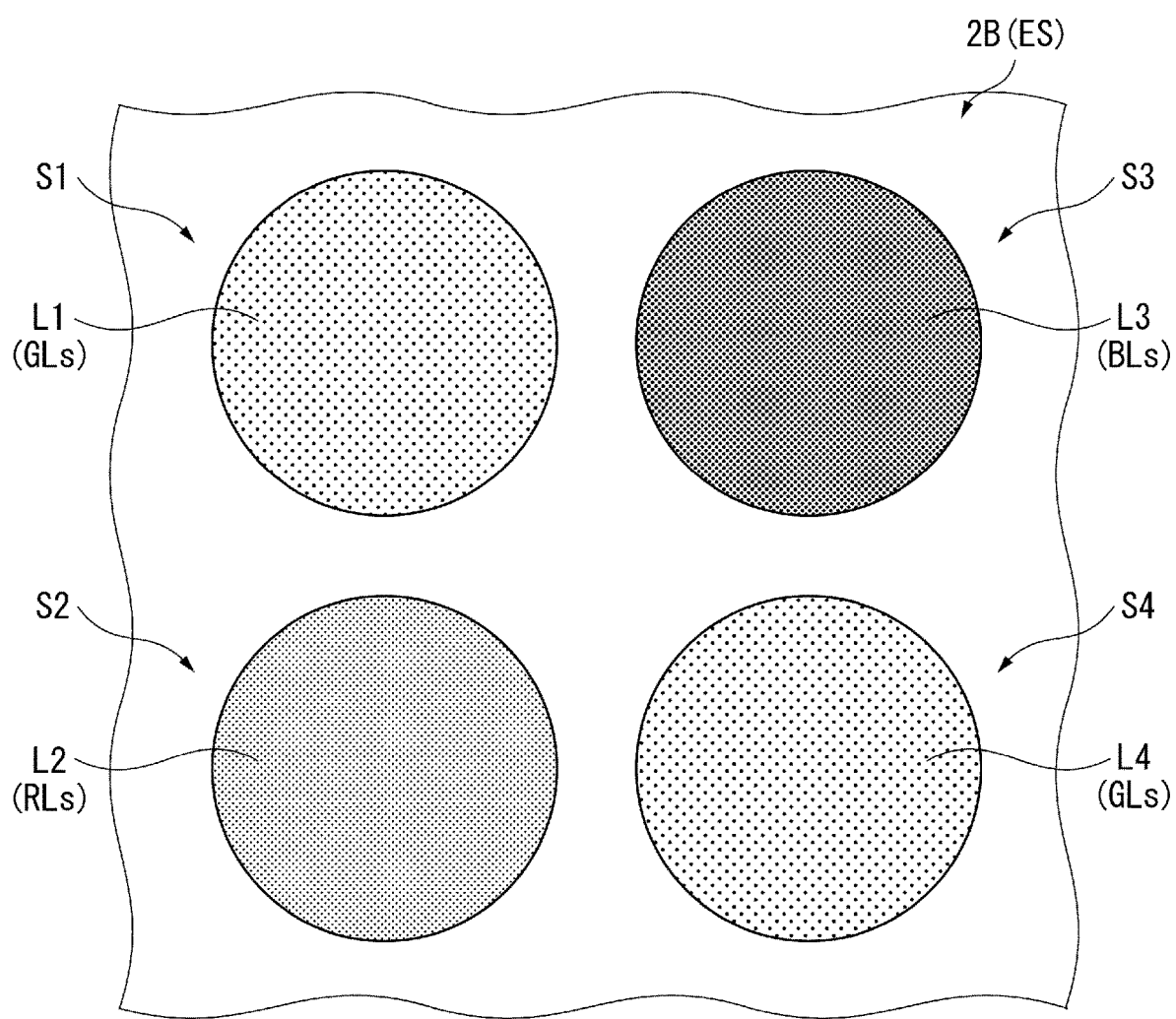
FIG. 19 shows light exiting sections via which color light fluxes exit out of the light source apparatus in the second embodiment.

FIG. 19 shows the light exiting sections which are provided in the light source apparatus 2B and via which the color light fluxes L1 to L4 exit.

The configuration described above allows the light source apparatus 2B to output the green light GLs as the first color light flux L1 via the first light exiting section S1 and the red light RLs as the second color light flux L2 via the second light exiting section S2, as shown in FIG. 19. The light source apparatus 2B further outputs the blue light BLs as the third color light flux L3 via the third light exiting section S3 and the green light GLs as the fourth color light flux L4 via the fourth light exiting section S4.

In the projector 1B, the sub-pixels SX4 of the plurality of pixels PX, which form the light modulator 6, modulate the green light GLs as the fourth color light flux L4. That is, out of the sub-pixels SX1 to SX4 of each of the pixels PX, the sub-pixels SX1 and SX4 modulate the green light GLs, the sub-pixel SX2 modulates the red light RLs, and the sub-pixel SX3 modulates the blue light BLs. The color reproducibility of an image formed by the light modulator 6 can thus be improved.

As described above, in the state in which any of the array sets 411 to 414 does not incline with respect to the imaginary plane VS, illuminance unevenness of the color light fluxes L1 to L4 occurs in the illumination receiving area AR. To avoid the problem, a pivotal mechanism that is not shown but is provided in the illumination optical apparatus 10B causes the second array set 412 and the third array set 413, which are array sets located on a diagonal line, out of the array sets 411 to 414 to pivot also in the present embodiment in such a way that the arrays sets 412 and 413 each have the suppressed attitude described above. A situation in which illuminance unevenness of the red light RLs, which is the second color light flux L2, and illuminance unevenness of the blue light BLs, which is the third color light flux L3, occur in the illumination receiving area AR is thus suppressed.

On the other hand, the light source apparatus 2B outputs the green light GLs via the first light exiting section S1 and the fourth light exiting section S4, which are array sets located on a diagonal line. In the state in which the first array set 411 does not incline with respect to the imaginary plane VS, the illuminance of the first color light flux L1 in the illumination receiving area AR increases with distance from the +X-direction-side and +Y-direction-side end of the illumination receiving area AR toward the −X-direction-side and −Y-direction-side end of the illumination receiving area AR. On the other hand, in the state in which the fourth array set 414 does not incline with respect to the imaginary plane VS, the illuminance of the fourth color light flux L4 in the illumination receiving area AR increases with distance from the −X-direction-side and −Y-direction-side end of the illumination receiving area AR toward the +X-direction-side and +Y-direction-side end of the illumination receiving area AR.

As a result, in the illumination receiving area AR, the illuminance unevenness of the green light GLs that is the first color light flux L1 and the illuminance unevenness of the green light GLs that is the fourth color light flux L4 cancel out with each other. Therefore, in the illumination optical apparatus 10B, the array sets 411 and 414 do not need to incline with respect to the imaginary plane VS.

Therefore, in the illumination optical apparatus 10B according to the present embodiment, the array sets 412 and 413, which are array sets located on a diagonal line and are located in the optical paths of color light fluxes that belong to wavelength bands different from each other, are so disposed that the attitudes of the array sets 412 and 413 incline with respect to the imaginary plane VS or the array sets 412 and 413 each have the suppressed attitude described above. On the other hand, the array sets 411 and 414, which are array sets located on another diagonal line and are located in the optical paths of color light fluxes that belong to the same wavelength band, are so disposed as to be parallel to the imaginary plane VS. That is, the array sets 412 and 413 are disposed in the suppressed attitude, which inclines with respect to the imaginary plane VS, whereas the array sets 411 and 414 are disposed in the attitude that does not incline with respect to the imaginary plane VS. The configuration of the illumination optical apparatus 10B can thus be simplified.

The arrangement described above is not necessarily employed, and the array sets 411 and 414 may instead be disposed in the suppressed attitude, which inclines with respect to the imaginary plane VS.

Effects of Second Embodiment

The projector 1B according to the present embodiment described above can provide the following effects as well as the same effects as those provided by the projector 1A.

The first color light flux L1 and the fourth color light flux L4 outputted by the light source apparatus 2B of the illumination optical apparatus 10B are color light fluxes that belong to the same wavelength band, and the second color light flux L2 and the third color light flux L3 are color light fluxes that belong to wavelength bands different from each other. The second array set 412 and the third array set 413, on which the color light fluxes that belong to wavelength bands different from each other are incident, each incline with respect to the imaginary plane VS in such a way that the first area 41A is shifted in the direction +Z from the second area 41B. On the other hand, the first array set 411 and the fourth array set 414, on which the color light fluxes that belong to the same wavelength band are incident, do not incline with respect to the imaginary plane VS.

The configuration described above allows the illuminance unevenness of the first color light flux L1 and the illuminance unevenness of the fourth color light flux L4 that occur in the illumination receiving area AR to cancel out with each other with no inclination of the first array set 411 or the fourth array set 414 with respect to the imaginary plane VS. Further, The inclining array sets 412 and 413 allow suppression of occurrence of illuminance unevenness of the second color light flux L2 and illuminance unevenness of the third color light flux L3 that occur in the illumination receiving area AR. Occurrence of illuminance unevenness of the color light fluxes L1 to L4 can be suppressed, and the configuration of the illumination optical apparatus 10B can thus be simplified.

The first color light flux L1 and the fourth color light flux L4 are each the green light GLs. The second color light flux L2 is the red light RLs, and the third color light flux L3 is the blue light BLs.

According to the configuration described above, the sub-pixels SX1 and SX4 can be used as sub-pixels that modulate green light, to which human eyes are highly sensitive. The color reproducibility of an image formed by the light modulator 6 can therefore be improved.

The light source apparatus 2B includes the third color separator 34 as well as the light source section 21, the first polarization separator 22, the second polarization separator 23, the first phase retarder 24, the first reflector 26, the wavelength converter 28, the second phase retarder 29, the first color separator 30, the second color separator 31, and the third phase retarder 32.

The third color separator 34 is located in the optical path of the yellow light YLs, which is the second polarized component of the converted light separated by the second color separator 31. Out of the yellow light YLs incident on the third color separator 34, the third color separator 34 outputs the green light GLs, which is the color light flux that belongs to the same wavelength band to which the first color light flux L1 belongs, as the fourth color light flux L4 and reflects the red light RLs, which is the other color light flux of the incident yellow light YLs.

According to configuration described above, the light source apparatus 2B can output the green light GLs as the first color light flux L1 and the fourth color light flux L4, the red light RLs as the second color light flux L2, and the blue light BLs as the third color light flux L3.

Third Embodiment

A third embodiment of the present disclosure will next be described.

The projector according to the present embodiment has the same configuration as that of the projector 1B according to the second embodiment but differs from the projector 1B in terms of the configuration of the light source apparatus. In the following description, the same or substantially the same portions as those having been already described have the same reference characters and will not be described.

Figure 20:
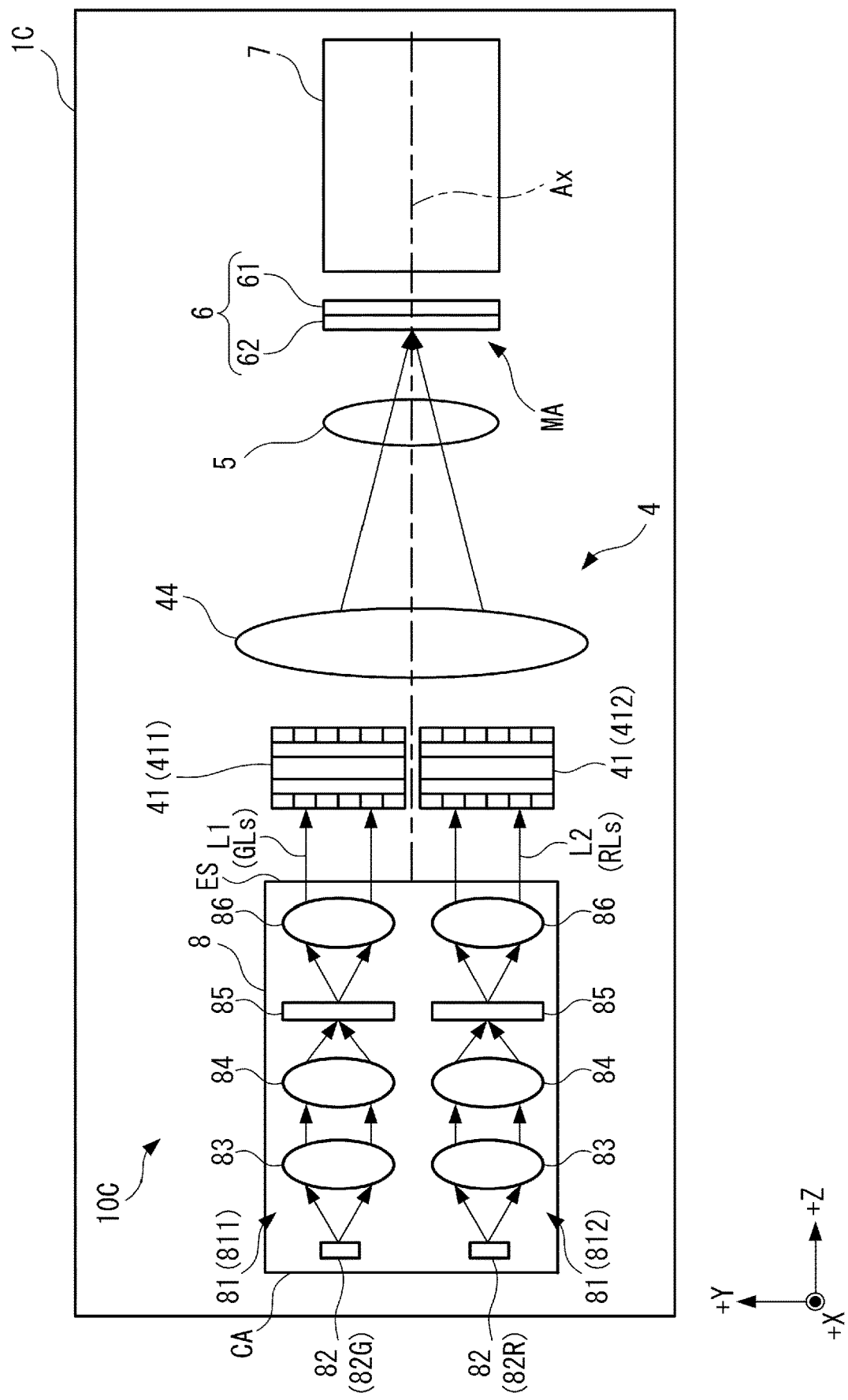
FIG. 20 is a diagrammatic view of a projector in a third embodiment viewed along the direction +X.
Figure 21:
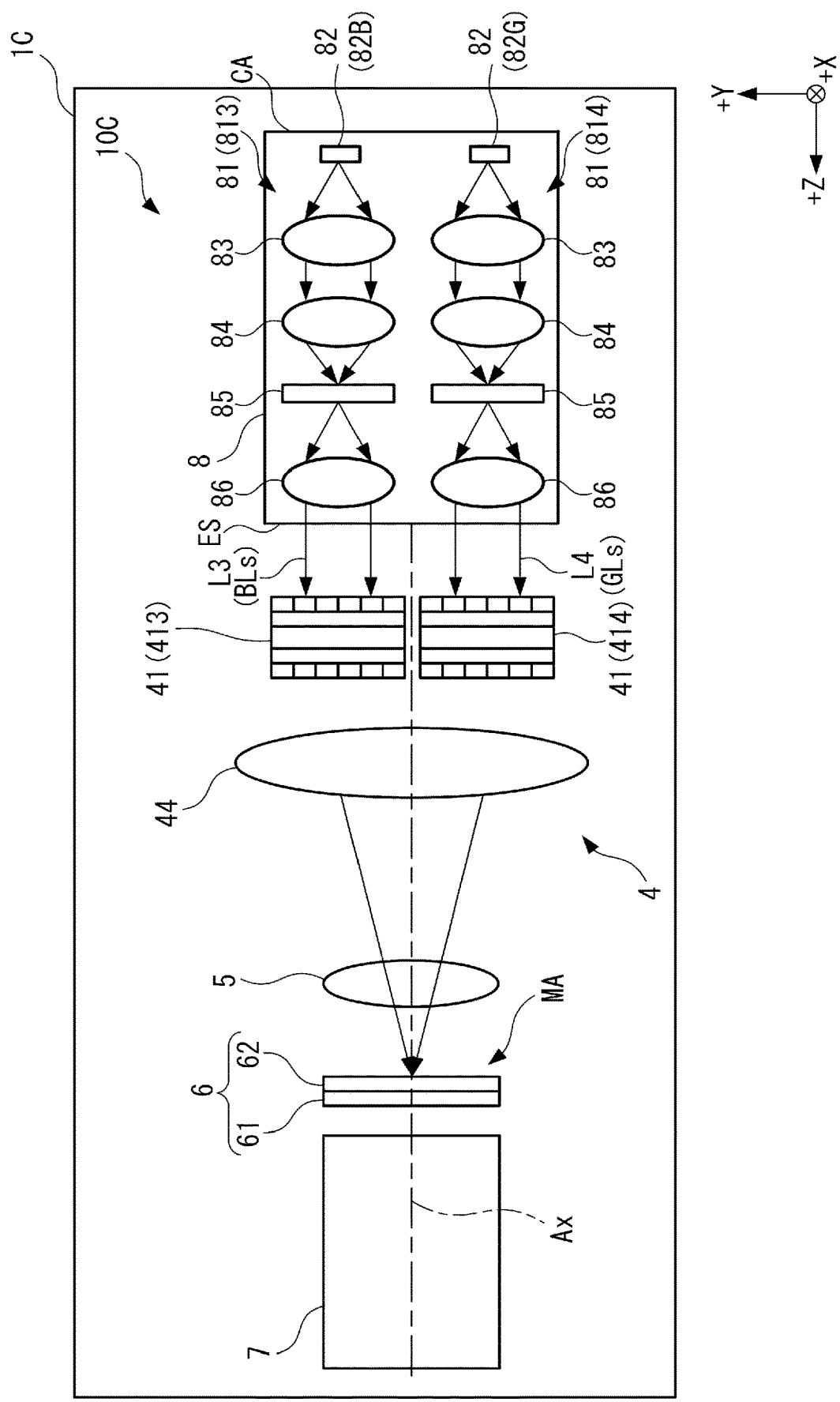
FIG. 21 is a diagrammatic view of the projector in the third embodiment viewed along the direction −X.

FIGS. 20 and 21 are diagrammatic views showing the configuration of a projector 1C according to the present embodiment. In detail, FIG. 20 is a diagrammatic view of the projector 1C viewed along the direction +X, and FIG. 21 is a diagrammatic view of the projector 1C viewed along the direction −X.

The projector 1C according to the present embodiment has the same configuration and function as those of the projector 1B except that the illumination optical apparatus 10B is replaced with an illumination optical apparatus 10C, as shown in FIGS. 20 and 21. The illumination optical apparatus 10C has the same configuration and function as those of the illumination optical apparatus 10B except that the light source apparatus 2B is replaced with a light source apparatus 8. That is, the illumination optical apparatus 10C includes the light source apparatus 8 and the homogenizer 4.

Configuration of Light Source Apparatus

Figure 22:
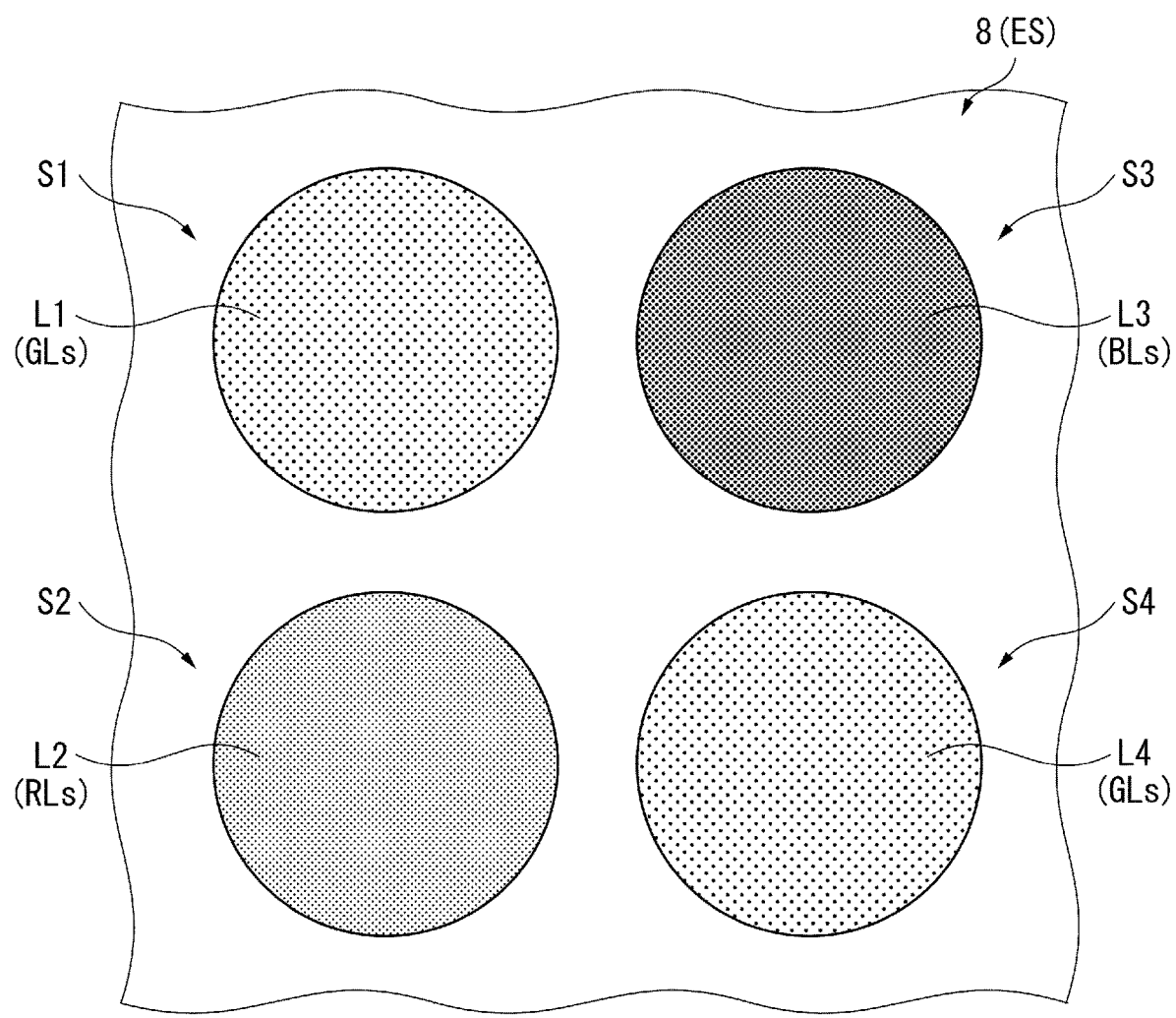
FIG. 22 shows light exiting sections via which color light fluxes exit from a light source apparatus in the third embodiment.
Figure 22:
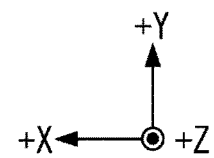

FIG. 22 shows the light exiting sections S1 to S4 of the light source apparatus 8 that are sections via which the color light fluxes L1 to L4 exit. In other words, FIG. 22 shows the light exiting surface ES of the light source apparatus 8 viewed along the direction +Z.

The light source apparatus 8 includes the enclosure CA, which is the light source apparatus enclosure, and four light source sections 81, which are provided in the enclosure CA. The light source apparatus 8 outputs the color light fluxes L1 to L4, which are linearly polarized light fluxes polarized in the same polarization direction and are spatially separate from one another, via the light exiting sections S1 to S4 located at the light exiting surface ES of the enclosure CA, and the color light fluxes L1 to L4 exit in the direction +Z.

Out of the four light source sections 81, a first light source section 811, which is located in a position shifted in the direction +X and the direction +Y, outputs the green light GLs as the first color light flux L1 via the first light exiting section S1, as shown in FIGS. 20 and 22. A second light source section 812, which is located in a position shifted in the direction +X and the direction −Y, outputs the red light RLs as the second color light flux L2 via the second light exiting section S2.

Out of the four light source sections 81, a third light source section 813, which is located in a position shifted in the direction −X and the direction +Y, outputs the blue light BLs as the third color light flux L3 via the third light exiting section S3, as shown in FIGS. 21 and 22. A fourth light source section 814, which is located in a position shifted in the direction −X and the direction −Y, outputs the green light GLs as the fourth color light flux L4 via the fourth light exiting section S4.

The light source sections 81 each include a light source 82, a collimator lens 83, a light collection lens 84, a diffuser 85, and a parallelizing lens 86, as shown FIGS. 20 and 21.

Out of the light sources 82, a light source 82G provided in each of the first light source section 811 and the fourth light source section 814 outputs the green light GLs in the direction +Z. Out of the light sources 82, a light source 82R provided in the second light source section 812 outputs the red light RLs in the direction +Z, and a light source 82B provided in the third light source section 813 outputs the blue light BLs in the direction +Z. The light sources 82 each include an LD that is a semiconductor laser that outputs the corresponding color light flux. However, at least one of the four light sources 82 may include another solid-state light source, such as an LED that outputs the corresponding color light flux. Further, the color light flux outputted by each of the light sources 82 may not be an s-polarized color light flux with respect to the light modulator 6 but may be a p-polarized color light flux with respect to the light modulator 6.

The collimator lenses 83 each parallelize the color light flux outputted from the corresponding light source 82, as do the collimator lenses 212.

The light collection lenses 84 each cause the color light flux having exited out of the corresponding collimator lens 83 into a spot on the corresponding diffuser 85.

The diffusers 85 each diffuse the color light flux incident thereon in the course of transmission of the incident color light flux through the diffuser 85 in the direction +Z. That is, the diffusers 85 each diffuse the color light flux incident in the direction −Z and output the diffused color light flux in the direction +Z. The diffusers 85 may be fixed or rotated around an axis of rotation parallel to the direction +Z.

The parallelizing lenses 86 each parallelize the color light flux diffused by the corresponding diffuser 85 and output the parallelized color light flux in the direction +Z. Out of the color light fluxes parallelized by the parallelizing lenses 86, the first color light flux L1 exits in the direction +Z via the first light exiting section S1, the second color light flux L2 exits in the direction +Z via the second light exiting section S2, the third color light flux L3 exits in the direction +Z via the third light exiting section S3, and the fourth color light flux L4 exits in the direction +Z via the fourth light exiting section S4.

The color light fluxes L1 to L4 outputted from the light source apparatus 8 pass through the homogenizer 4 and enter the light modulator 6 via the field lens 5. Images formed as a result of the modulation of the color light fluxes L1 to L4 performed by the light modulator 6 are projected via the projection optical apparatus 7 on the projection receiving surface.

Out of the array sets 411 to 414 of the homogenizer 4, the arrays sets 412 and 413, which are located along a diagonal line, are so disposed as to incline with respect to the imaginary plane VS in such a way that the first area 41A is shifted in the direction +Z from the second area 41B, as in the illumination optical apparatus 10B. The other array sets 411 and 414, which are located along another diagonal line, may not incline with respect to the imaginary plane VS because the light fluxes that belong to the same wavelength band and each formed of the green light flux GLs, enter the arrays sets 411 and 414, as in the illumination optical apparatus 10B, or may incline with respect to the imaginary plane VS, as in the illumination optical apparatus 10A.

The projector 1C according to the present embodiment described above can provide the same effects as those provided by the projectors 1A and 1B.

The light source 82 provided in the fourth light source section 814 is the light source 82G, which outputs the green light flux GLs in the above description, but not necessarily, and may instead be a solid-state light source that outputs the yellow light YLs. In this case, the first array set 411 and the fourth array set 414 are each so disposed as to incline with respect to the imaginary plane VS in such a way that the first area 41A is shifted in the direction +Z from the second area 41B, whereby occurrence of illuminance unevenness of the first color light flux L1 in the illumination receiving area AR can be suppressed, and occurrence of illuminance unevenness of the fourth color light flux L4 in the illumination receiving area AR can be suppressed.

Variations of Embodiments

The present disclosure is not limited to the embodiments described above, and variations, improvements, and other modifications to the extent that the advantage of the present disclosure is achieved fall within the scope of the present disclosure.

In the embodiments described above, the light source apparatuses 2A, 2B, and 8 each output the green light flux GLs as the first color light flux L1, the red light flux RLs as the second color light flux L2, and the blue light flux BLs as the third color light flux L3. The light source apparatus 2A outputs the yellow light YLs as the fourth color light flux L4, and the light source apparatuses 2B and 8 each output the green light GLs as the fourth color light flux L4. The color light fluxes L1 to L4 are, however, not necessarily assigned described above. For example, the first color light flux L1 may be blue light, the second color light flux L2 and the third color light flux L3 may each be green light, and the fourth color light flux L4 may be red light. That is, the first color light flux L1 may not be green light, the second color light flux L2 may not be red light, and the third color light flux L3 may not be blue light. The fourth color light flux L4 may not be yellow light or green light. Further, in the second and third embodiments described above, the color light fluxes that belong to the same wavelength band may be the second color light flux L2 and the third color light flux L3. In this case, the second array set 412, which is provided in the optical path of the second color light flux L2, and the third array set 413, which is provided in the optical path of the third color light flux L3, may not incline with respect to the imaginary plane VS.

In the embodiments described above, the plurality of color light fluxes L1 to L4 outputted by the light source apparatuses 2A, 2B, and 8 are each an s-polarized color light flux, but not necessarily, and the light fluxes outputted by the light source apparatuses may each be a p-polarized color light flux. Further, the light fluxes outputted by the light source apparatus in any of the illumination optical apparatuses in the present disclosure may not each be one type of polarized light having an aligned polarization state and may instead each be light containing s-polarized light and p-polarized light mixed with each other or light containing circularly polarized light.

In the embodiments described above, the direction in which the light source apparatuses 2A, 2B, and 8 each output the light is the direction +Z, and out of the directions +X and +Y, which are the two directions perpendicular to the direction +Z and perpendicular to each other, the direction +Y is the upward direction in each of the projectors 1A, 1B, and 1C. The direction +Z is the first direction, the direction +X is the second direction, and the direction +Y is the third direction. The directions may not necessarily be defined as described above. For example, the second direction may be any of the direction −X, the direction +Y, and the direction −Y, and the third direction only needs to be perpendicular to the first and second directions. Further, the second and third directions may not necessarily be perpendicular to the first direction and only need to be directions that intersect the first direction and perpendicular to each other.

In the embodiments described above, at the light exiting surface ES, the first light exiting section S1, via which the first color light flux L1 exits, is located in a position shifted in the direction +X, which is the second direction, from the illumination optical axis Ax and in the direction +Y, which is the third direction, from the illumination optical axis Ax. The second light exiting section S2, via which the second color light flux L2 exits, is located in a position shifted in the direction +X from the illumination optical axis Ax and in the direction −Y from the illumination optical axis Ax. The third light exiting section S3, via which the third color light flux L3 exits, is located in a position shifted in the direction −X from the illumination optical axis Ax and in the direction +Y from the illumination optical axis Ax. The fourth light exiting section S4, via which the fourth color light flux L4 exits, is located in a position shifted in the direction −X from the illumination optical axis Ax and in the direction −Y from the illumination optical axis Ax. That is, the first light exiting section S1 faces the first array set 411, the second light exiting section S2 faces the second array set 412, the third light exiting section S3 faces the third array set 413, and the fourth light exiting section S4 faces the fourth array set 414 in the direction +Z, but not necessarily, and the first light exiting section S1, via which the first color light flux L1 to be incident on the first array set 411 exit, may not necessarily face the first array set 411. The same holds true for the other light exiting sections S2 to S4.

In the embodiments described above, the array sets 41 are each caused to pivot around the pivotal axis Y, which is parallel to the widthwise direction of the modulation area MA in the light modulator 6, and the pivotal axis X, which is parallel to the lengthwise direction of the modulation area MA, to incline with respect to the imaginary plane VS perpendicular to the illumination optical axis Ax, but not necessarily. The array sets 41 may each be caused to pivot around at least one of the pivotal axes Y and X to incline with respect to the imaginary plane VS in such a way that the first area 41A, which is closer to the illumination optical axis Ax, is shifted in the direction +Z from the second areas 41B, which is farther from the illumination optical axis Ax.

In the embodiments described above, the array sets 41 each have the configuration in which the light-incident-side lens array 42 and the light-exiting-side lens array 43 are integrated with each other, but not necessarily. The light-incident-side lens array 42 and the light-exiting-side lens array 43 are not necessarily integrated with each other as long as the light-exiting-side lens array 43 incline along with the light-incident-side lens array 42 with respect to the imaginary plane VS as described above.

In the embodiments described above, the array sets 41 are caused by the pivot mechanism that is not shown to pivot around at least one of the pivotal axes Y and X to incline with respect to the imaginary plane VS in such a way that the first area 41A, which is closer to the illumination optical axis Ax, is shifted in the direction +Z from the second areas 41B, which is farther from the illumination optical axis Ax, but not necessarily. A target array set 41 only needs to be so disposed as to incline with respect to the imaginary plane VS in such a way that the first area 41A, which is closer to the illumination optical axis Ax, is shifted in the direction +Z from the second areas 41B, which is farther from the illumination optical axis Ax, and the pivot mechanism is not an essential component.

In the first embodiment described above, the four array sets 41 all incline with respect to the imaginary plane VS. In the second and third embodiments described above, the two arrays sets 412 and 413 incline with respect to the imaginary plane VS. The configurations described above are not necessarily employed, and at least one of the array sets 41 may incline with respect to the imaginary plane VS.

In the first embodiment described above, the configurations of the light source apparatuses 2A and 2B are shown in FIGS. 3 to 5 and 18 described above, and in the third embodiment described above, the configuration of the light source apparatus 8 is shown in FIGS. 20 and 21 described above, but the configuration of a light source apparatus to which the present disclosure is applicable is not limited to the configurations described above. That is, the present disclosure is applicable to any light source apparatus that outputs a plurality of spatially separate color light fluxes.

For example, the light source section 21 outputs the blue light BLs and the blue light BLp in the direction +X, but not necessarily. The light sources 211 may output the blue light BLs and the blue light BLp in a direction that intersects the direction +X, and the blue light BLs and the blue light BLp may be so reflected off a reflection member in the direction +X as to enter the first polarization separator 22 in the direction +X.

Further, for example, the light source apparatuses 2A and 2B may not each include at least one of the first light collector 25 and the second light collector 27.

In the embodiments described above, the light source apparatuses 2A, 2B, and 8 each include the enclosure CA, which is the light source apparatus enclosure, but not necessarily. The light source apparatuses 2A, 2B, and 8 may not each include the enclosure CA. In this case, the light exiting sections S1 to S4 may be located in positions in a plane perpendicular to the illumination optical axis Ax that are the positions where the color light fluxes L1 to L4 pass.

In the embodiments described above, the light source apparatuses 2A, 2B, and 8 each output light to be incident on the light modulator 6, which includes the liquid crystal panel 61 and the microlens array 62, but not necessarily. The light modulator illuminated by any of the light source apparatuses in the present disclosure does not necessarily have the configuration described above. The same holds true for the illumination optical apparatuses 10A, 10B, and 10C.

The illumination optical apparatuses of the present disclosure are not necessarily each used with a light source apparatus employed in a projector any may instead be used other applications.

What is claimed is:

1. An illumination optical apparatus comprising:
    a light source apparatus that outputs light in a first direction along an illumination optical axis; and
    a homogenizer that irradiates an illumination receiving area with the light outputted from the light source apparatus in a substantially uniform manner,
    wherein the light source apparatus includes
        a first light exiting section via which a first color light flux exits,
        a second light exiting section via which a second color light flux exits,
        a third light exiting section via which a third color light flux exits, and
        a fourth light exiting section via which a fourth color light flux exits,
    the first, second, third, and fourth light exiting sections are provided in positions different from one another,
    the homogenizer includes,
        when two directions that intersect the first direction and are perpendicular to each other are second and third directions,
        a first array set which includes a pair of lens arrays each disposed in a position shifted in the second direction from the illumination optical axis and in the third direction from the illumination optical axis and on which the first color light flux is incident,
        a second array set which includes a pair of lens arrays each disposed in a position shifted in the second direction from the illumination optical axis and in a direction opposite the third direction from the illumination optical axis and on which the second color light flux is incident,
        a third array set which includes a pair of lens arrays each disposed in a position shifted in a direction opposite the second direction from the illumination optical axis and in the third direction from the illumination optical axis and on which the third color light flux is incident,
        a fourth array set which includes a pair of lens arrays each disposed in a position shifted in the direction opposite the second direction from the illumination optical axis and in the direction opposite the third direction from the illumination optical axis and on which the fourth color light flux is incident, and
        a superimposing lens that superimposes the first color light flux that passes through the first array set, the second color light flux that passes through the second array set, the third color light flux that passes through the third array set, and the fourth color light flux that passes through the fourth array set on the illumination receiving area,
    the first, second, third, and fourth array sets each have
        a first area, and
        a second area a distance from which to the illumination optical axis is longer than a distance from the first area to the illumination optical axis, and
        at least one of the first, second, third, and fourth array sets inclines with respect to an imaginary plane perpendicular to the illumination optical axis in such a way that the first area is shifted in the first direction from the second area.

2. The illumination optical apparatus according to claim 1,
    wherein the first light exiting section is located in a position shifted in the second direction from the illumination optical axis and in the third direction from the illumination optical axis,
    the second light exiting section is located in a position shifted in the second direction from the illumination optical axis and in the direction opposite the third direction from the illumination optical axis,
    the third light exiting section is located in a position shifted in the direction opposite the second direction from the illumination optical axis and in the third direction from the illumination optical axis, and
    the fourth light exiting section is located in a position shifted in the direction opposite the second direction from the illumination optical axis and in the direction opposite the third direction from the illumination optical axis.

3. The illumination optical apparatus according to claim 1,
    wherein the first, second, third, and fourth color light fluxes are color light fluxes that belong to wavelength bands different from one another, and the first, second, third, and fourth array sets each incline with respect to the imaginary plane in such a way that the first area is shifted in the first direction from the second area.

4. The illumination optical apparatus according to claim 1,
wherein the first color light flux is green light,
the second color light flux is red light,
the third color light flux is blue light, and
the fourth color light flux is yellow light.

5. The illumination optical apparatus according to claim 4,
wherein the light source apparatus includes
a light source section that outputs light source light,
a first polarization separator that transmits a first polarized component of the light source light out of the light source light incident in the second direction on the first polarization separator in such a way that the transmitted first polarized component travels in the second direction and reflects a second polarized component of the light source light out of the incident light source light in such a way that the reflected second polarized component travels in a direction opposite the first direction,
a second polarization separator that is located in a position shifted in the second direction from the first polarization separator and reflects the first polarized component of the light source light incident in the second direction on the second polarization separator in such a way that the reflected first polarized component travels in the direction opposite the first direction,
a first reflector that is located in a position shifted in the direction opposite the first direction from the first polarization separator and reflects the light source light incident on the first reflector in such a way that the reflected light source light travels in the first direction,
a first phase retarder that is located between the first polarization separator and the first reflector in the first direction and converts a polarization state of the light source light,
a wavelength converter that is located in a position shifted in the direction opposite the first direction from the second polarization separator, converts a wavelength of the first polarized component of the light source light incident in the direction opposite the first direction on the wavelength converter, and outputs nonpolarized converted light that is the converted first polarized component in the first direction,
a second phase retarder that is a half wave plate which is located in a position shifted in the first direction from the second polarization separator and on which the converted light that passes through the second polarization separator is incident,
a first color separator that is located in a position shifted in the first direction from the second phase retarder and separates the converted light incident from the second phase retarder on the first color separator into the first color light flux and the second color light flux,
a second color separator that is located in a position shifted in the first direction from the first polarization separator and separates the light incident in the first direction from the first polarization separator on the second color separator into the third color light flux and the fourth color light flux, and a third phase retarder that is a half wave plate that is located in an optical path of the third color light flux separated by the second color separator, converts a polarization direction of the third color light flux, and outputs the converted third color light flux,
the second polarization separator transmits in the first direction the first polarized component of the converted light out of the converted light incident in the first direction on the second polarization separator to cause the first polarized component to enter the second phase retarder and reflects the second polarized component of the converted light in the direction opposite the second direction, and
the first polarization separator transmits in the first direction the first polarized component of the light source light incident in the first direction on the first polarization separator to cause the first polarized component to enter the second color separator and reflects in the first direction the second polarized component of the converted light incident in the direction opposite the second direction on the first polarization separator to cause the second polarized component to enter the second color separator.

6. The illumination optical apparatus according to claim 5,
wherein the light source apparatus includes a partial reflector that is provided in an optical path of the fourth color light flux that exits out of the second color separator, transmits a portion of the fourth color light flux incident on the partial reflector, and reflects another portion of the fourth color light flux.

7. The illumination optical apparatus according to claim 1,
wherein the first and fourth color light fluxes are color light fluxes that belong to the same wavelength band,
the second and third color light fluxes are color light fluxes that belong to wavelength bands different from each other, and
the second and third array sets each incline with respect to the imaginary plane in such a way that the first area is shifted in the first direction from the second area.

8. The illumination optical apparatus according to claim 7,
wherein the first and fourth color light fluxes are each green light,
the second color light flux is red light, and
the third color light flux is blue light.

9. The illumination optical apparatus according to claim 8,
wherein the light source apparatus includes
a light source section that outputs light source light,
a first polarization separator that transmits a first polarized component of the light source light out of the light source light incident in the second direction on the first polarization separator in such a way that the transmitted first polarized component travels in the second direction and reflects a second polarized component of the light source light out of the incident light source light in such a way that the reflected second polarized component travels in a direction opposite the first direction,
a second polarization separator that is located in a position shifted in the second direction from the first polarization separator and reflects the first polarized component of the light source light incident in the second direction on the second polarization separator in such a way that the reflected first polarized component travels in the direction opposite the first direction, a first reflector that is located in a position shifted in the direction opposite the first direction from the first polarization separator and reflects the light source light incident on the first reflector in such a way that the reflected light source light travels in the first direction, a first phase retarder that is located between the first polarization separator and the first reflector in the first direction and converts a polarization state of the light source light, a wavelength converter that is located in a position shifted in the direction opposite the first direction from the second polarization separator, converts a wavelength of the first polarized component of the light source light incident in the direction opposite the first direction on the wavelength converter, and outputs nonpolarized converted light that is the converted first polarized component in the first direction, a second phase retarder that is a half wave plate which is located in a position shifted in the first direction from the second polarization separator and on which the converted light that passes through the second polarization separator is incident, a first color separator that is located in a position shifted in the first direction from the second phase retarder and separates the converted light incident from the second phase retarder on the first color separator into the first color light flux and the second color light flux, a second color separator that is located in a position shifted in the first direction from the first polarization separator and separates the light incident in the first direction from the first polarization separator on the second color separator into the first polarized component of the light source light and the second polarized component of the converted light, a third phase retarder that is a half wave plate that is located in an optical path of the first polarized component of the light source light separated by the second color separator, converts a polarization direction of the second polarized component of the light source light, and outputs the converted second polarized component as the third color light flux, and a third color separator that is located in an optical path of a second polarized component of the converted light separated by the second color separator, outputs as the fourth color light flux a color light flux that belongs to the same wavelength band to which the first light source light belongs out of the second polarized component of the converted light incident on the third color separator, and reflects other color light fluxes, the second polarization separator transmits in the first direction the first polarized component of the converted light out of the converted light incident in the first direction on the second polarization separator to cause the first polarized component to enter the second phase retarder and reflects the second polarized component of the converted light in the direction opposite the second direction, and the first polarization separator transmits in the first direction the first polarized component of the light source light incident in the first direction on the first polarization separator to cause the first polarized component to enter the second color separator and reflects in the first direction the second polarized component of the converted light incident in the direction opposite the second direction on the first polarization separator to cause the second polarized component to enter the second color separator.

10. The illumination optical apparatus according to claim 1,
wherein at least one of the array sets is caused to pivot around at least one of a pivotal axis parallel to the second direction and a pivotal axis parallel to the third direction to incline with respect to the imaginary plane.

11. The illumination optical apparatus according to claim 1,
wherein the illumination receiving area is an oblong area having long sides parallel to the second direction when viewed from a light incident side and short sides parallel to the third direction when viewed from the light incident side, and
at least one of the array sets is caused to pivot at least around a pivotal axis along the third direction to incline with respect to the imaginary plane.

12. A projector comprising:
the illumination optical apparatus according to claim 1;
a light modulator having a modulation area that modulates light incident from the illumination optical apparatus; and
a projection optical apparatus that projects the light modulated by the light modulator,
wherein the modulation area is located at the illumination receiving area.

* * * * *